(12) United States Patent
Tuomi

(10) Patent No.: US 7,248,266 B2
(45) Date of Patent: *Jul. 24, 2007

(54) 3-D RENDERING ENGINE WITH EMBEDDED MEMORY

(75) Inventor: Mika Henrik Tuomi, Soormarkku (FI)

(73) Assignee: Bitboys Oy (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/776,032

(22) Filed: Feb. 10, 2004

(65) Prior Publication Data

US 2005/0062747 A1    Mar. 24, 2005

Related U.S. Application Data

(63) Continuation of application No. 10/013,050, filed on Nov. 12, 2001, now Pat. No. 6,690,377.

(60) Provisional application No. 60/248,159, filed on Nov. 12, 2000.

(51) Int. Cl.
*G09G 5/39* (2006.01)
*G06F 13/14* (2006.01)
*G06F 12/10* (2006.01)

(52) U.S. Cl. .................. 345/531; 345/519; 345/568

(58) Field of Classification Search ........... 345/501, 345/502, 506, 530, 536, 566, 564, 568, 519, 345/531; 711/200, 203, 202, 206

See application file for complete search history.

(56) References Cited

U.S. PATENT DOCUMENTS

| | | | | |
|---|---|---|---|---|
| 5,623,692 A | * | 4/1997 | Priem et al. | 710/3 |
| 6,215,497 B1 | * | 4/2001 | Leung | 345/419 |
| 6,295,068 B1 | * | 9/2001 | Peddada et al. | 345/419 |
| 6,329,997 B1 | * | 12/2001 | Wu et al. | 345/519 |
| 2001/0008400 A1 | * | 7/2001 | Moriwaki et al. | 345/534 |

* cited by examiner

*Primary Examiner*—Kee M. Tung
*Assistant Examiner*—Hau Nguyen
(74) *Attorney, Agent, or Firm*—Howison & Arnott, L.L.P.

(57) ABSTRACT

A 3-D rendering engine with embedded memory a graphics engine. A graphics engine is disclosed that includes a rendering engine for receiving graphics primitives and converting them to pixel information for transfer to a display, The rendering engine is operable to access memory locations with multiple memory access requests for a Read or a Write operation and operable in a first address space. A plurality of memory blocks are provided, each individually accessible and all configured in a virtual address space different than said first address space. A memory mapping device is provided for mapping each of the memory requests to the virtual address space. A pipeline engine is operable to pipeline the mapped memory access requests for both Read and Write operations in accordance with a predetermined pipelining scheme. The memory access requests are received in parallel and processed asynchronously, such that access to more than one of the memory blocks can occur at substantially the same time.

10 Claims, 14 Drawing Sheets

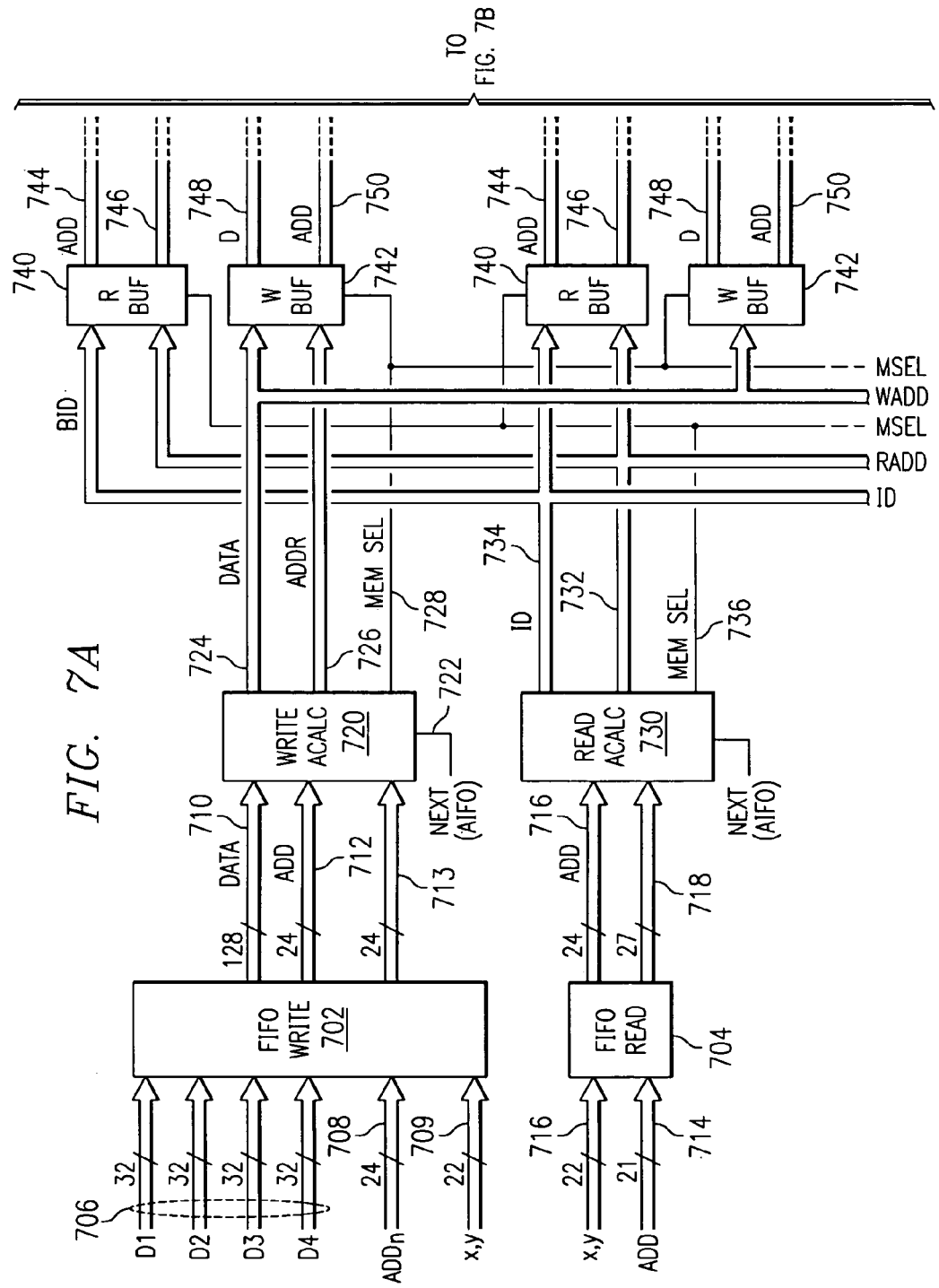

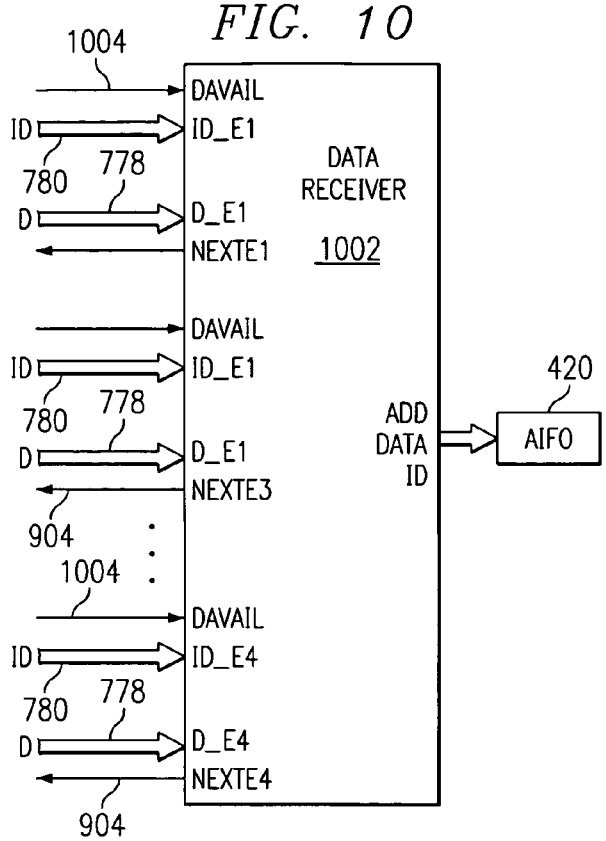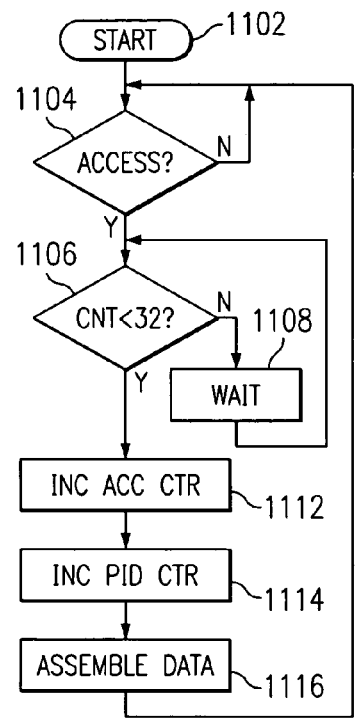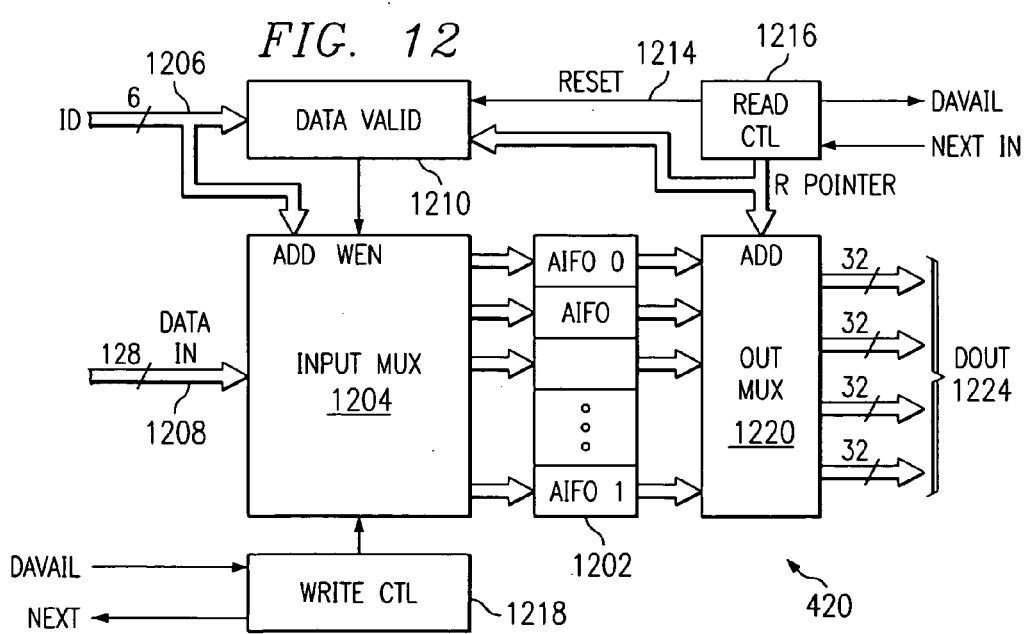

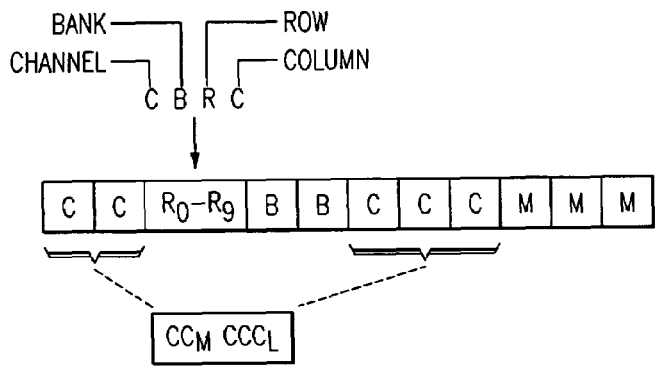
FIG. 22
FIG. 23
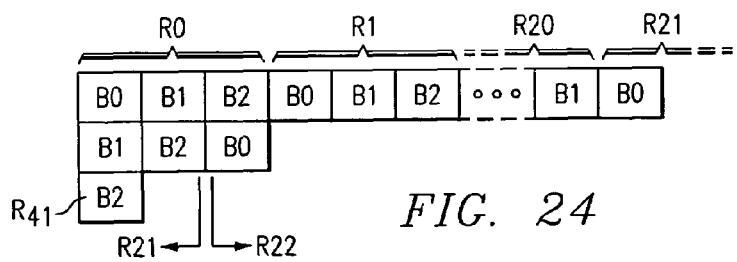
FIG. 24

3-D RENDERING ENGINE WITH EMBEDDED MEMORY

CROSS-REFERENCE TO RELATED APPLICATIONS

This application is a Continuation of application Ser. No. 10/013,050 filed Nov. 12, 2001, now U.S. Pat. No. 6,690,377, issued on Feb. 10, 2004 entitled "3-D RENDERING ENGINE WITH EMBEDDED MEMORY," which application claims priority to U.S. Provisional Application Ser. No. 60/248,159, entitled "3-D RENDERING ENGINE WITH EMBEDDED MEMORY," filed Nov. 12, 2000.

TECHNICAL FIELD OF THE INVENTION

The present invention pertains in general to 3-D graphics engines and more particularly, to a 3-D graphics engine that utilizes embedded DRAM for processing information internal to a graphics integrated circuit.

BACKGROUND OF THE INVENTION

Due to recent advances in computer performance in the area of processing speeds, graphic systems have been improved to provide more realistic graphical images to operate with such things as home video games and the such. In these graphic systems, the data is processed to "render" or draw graphic primitives to the display of a system. These graphic primitives constitute the basic components of a graphics picture, such as a triangle or any type of polygon. It is the combination of these graphic primitives that is utilized to perform this rendering operation.

During the rendering operation, a frame buffer is utilized to store all the information for a given frame, the frame being mapped substantially to the display of the user. This frame buffer will therefore include all of the information that is necessary to interface with the display and allow the display to be written in the desired manner. During the rendering operation, these frame buffers must be accessed a number of times in order to create the final values that are to be output to the display. In the rendering operation, there are multiple operations that must be undertaken. Each of these operations requires access to the frame buffer or memory to Write data thereto or Read data therefrom. As the graphic systems become more complex, and more complex algorithms are utilized, access to the memory becomes the "bottleneck" to the overall operation of the system. Typically, there will be provided some type of bus structure that will interface with the memory. As the resolution increases in the graphic systems, more and more memory is required for storing the various information required for the rendering process. This memory tends to be external to the rendering engine and there is typically only provided a single bus that provides access to the memory, which bus usually has a defined width and data rate. Further, when a substantial amount of processing is provided on a single integrated circuit, the bus width becomes more problematic due to the number of pins on the integrated circuit that must be dedicated to interface with the external memory. Even though some memory could be included on the integrated circuit, as the memory requirements increase, they tend to exceed the capabilities of the semiconductor processing technology required for this 3-D rendering engine.

SUMMARY OF THE INVENTION

The present invention disclosed and claimed herein, in one aspect thereof, comprises a graphics engine. The graphics engine includes a rendering engine for receiving graphics primitives and converting them to pixel information for transfer to a display. The rendering engine is operable to access memory locations with multiple memory access requests for a Read or a Write operation and operable in a first address space. A plurality of memory blocks are provided, each individually accessible and all configured in a virtual address space different than said first address space. A memory mapping device is provided for mapping each of the memory requests to the virtual address space. A pipeline engine is operable to pipeline the mapped memory access requests for both Read and Write operations in accordance with a predetermined pipelining scheme. The memory access requests are received in parallel and processed asynchronously, such that access to more than one of the memory blocks can occur at substantially the same time.

BRIEF DESCRIPTION OF THE DRAWINGS

For a more complete understanding of the present invention and the advantages thereof, reference is now made to the following description taken in conjunction with the accompanying Drawings in which:

FIGS. 7A and 7B illustrate a more detailed diagram of the data flow path for two memories through the memory management unit;

FIG. 10 illustrates a diagrammatic view of the data receiver;

FIG. 11 illustrates a flow chart depicting the color operation for the address calculations;

FIG. 12 illustrates a diagrammatic view of the AIFO;

FIG. 22 illustrates a diagrammatic view of the address that is generated by the MMU;

FIG. 23 illustrates a diagrammatic view of a single bank and the mapping thereof to the memory;

FIG. 24 illustrates a detail of tiles and the associated banks and associated rows;

DETAILED DESCRIPTION OF THE INVENTION

Figure 1:
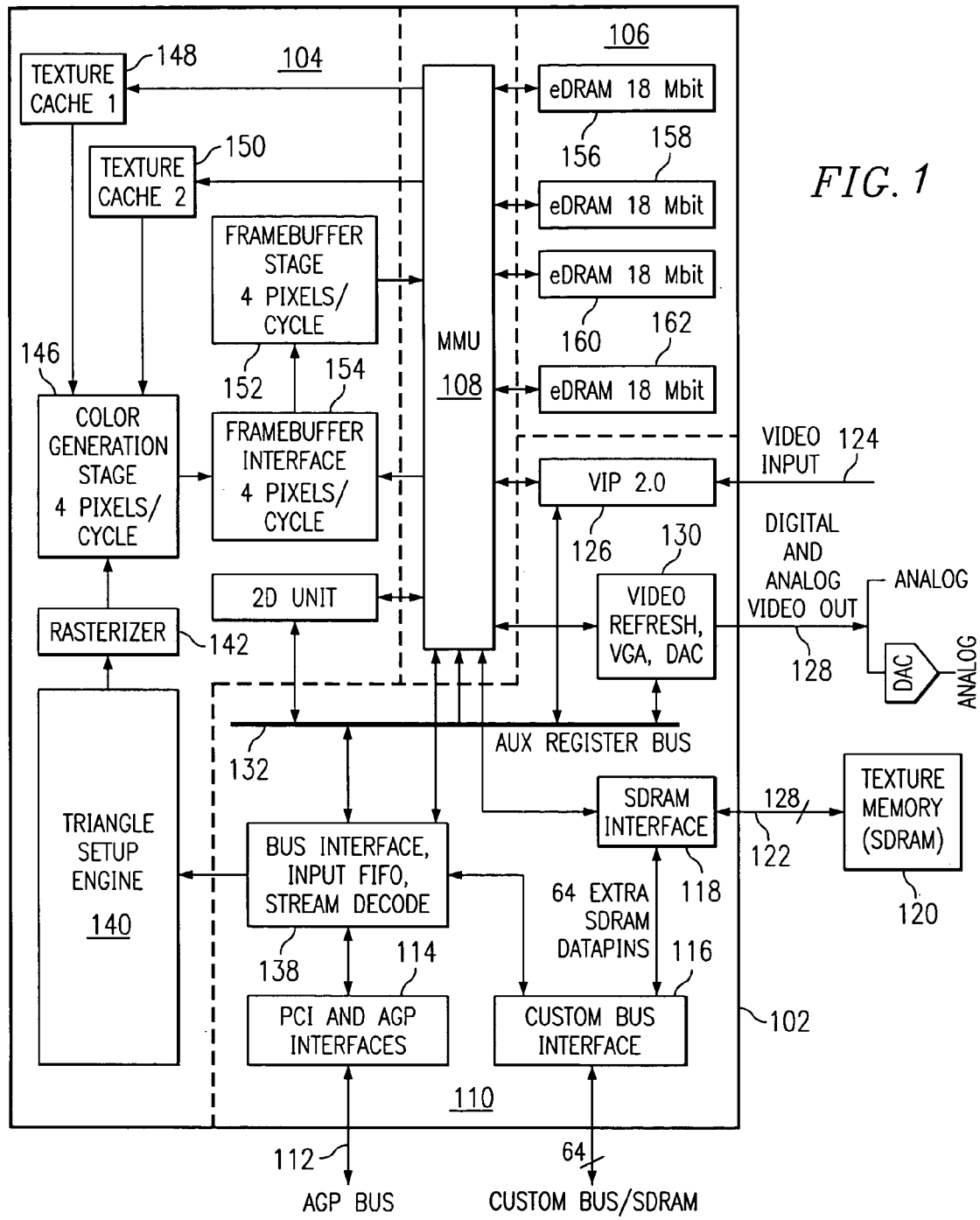
FIG. 1 illustrates an overall diagrammatic view of the graphics integrated circuit with embedded memory.

Referring now to FIG. 1, there is illustrated a diagrammatic view of a graphics integrated circuit 102 for performing a rendering operation which is operable to receive data and provide a video output. The graphic chip includes a number of sections. A 3-D core 104 is provided which is operable to receive input data from an application and rasterize that data into pixels for storage in memory; i.e., it receives graphics primitives and converts them into pixels. There is provided a memory section 106 which comprises the embedded DRAM (eDRAM) S&R. The 3-D core 104 interfaces with the memory section 106 with a memory management unit (MMU) 108. There is also provided an input/output (I/O) section 110.

The integrated circuit 102 is operable to interface with various external resources. The I/O section 110 interfaces with an Accelerated Graphics Port (AGP) bus 112 via a PCI and AGP interface block 114. Additionally, there is provided a custom bus interface 116 in the I/O interface 110 interfacing with a custom bus. A Static Random Access Memory (SDRAM) interface 118 is provided for interfacing with external SDRAM, as indicated by a block 120. The SDRAM interface 118 is interfaced with the MMU 108. This SDRAM 120 is indicated as being associated with texture information. However, this could be associated with any portion of the frame buffer, etc., that is utilized in the rendering process. This merely provides additional memory. The SDRAM 120 is interfaced through a 128 pin port and bus 122 that is connected to the SDRAM interface 118. Therefore, the integrated circuit 102 is operable to interface with external memory via the bus 122 that has a width of 128 (although specific lens widths are disclosed by way of example in the present disclosure, it should be understood that this is not a limitation and a bus width of any size is contemplated). There is also provided a video input on a port 124 that interfaces with the MMU 108 through a Video Interface Port (VIP) block 126. Video output is provided on a port 128 that is operable to provide both digital and analog video output, which is generated by a video refresh VGA/DAC block 130 that interfaces with the MMU 108 and also with an internal auxiliary bus 132 in the I/O section 110. The MMU 108 also interfaces with the bus 132, as well as does the 3-D core 104.

The 3-D core 104 is operable to receive data through the host interface section, which is comprised of a bus interface portion 138, from the PCI and AGP interfaces 114 and also through the custom bus interface 116. This data is buffered in a FIFO and there is also provided the coding of the data string. This data can be input to the MMU 108 through the register bus 132, or it can be input through a triangle setup engine 140 for processing thereof. The triangle setup engine 140 is a floating point CPU with four ALUs. Each ALU contains a floating point adder and a floating point multiplier. One floating point divider is shared between the ALUs. Data is received from the stream decode portion of the interface 138, the data processed to define all the triangles or polygons and then output this information to the rasterizer 142.

The rasterizer 142 is operable to work in variable-sized tiles (e.g., 8×8, 16×16, 32×32, 32×128, 64×64, 64×256 pixels). The rasterizer 142 traverses a primitive tile-by-tile and generates 4-pixel packets for the color generation stage of all pixels in a primitive belonging to the current tile. Each pixel is 32-bits in length (four 8-bit words). The tile width and height can be configured separately in powers of 2. The rasterizer 142 will rasterize all pixels in a triangle. Although not described herein, the rasterizer also supports anti-aliasing. This is the subject of U.S. patent application Ser. No. 09/711,859, entitled "Antialiasing Method And Apparatus For Video Applications," filed Nov. 12, 2000 which is incorporated herein by reference.

In general, the tile rasterization order depends on orientation of the primitive. Rasterization starts from the top and traverses downwards row-by-row. The first tile encountered on the row, (the tile with the left X-coordinate of the first valid scanline hits) is rasterized first, then the rest of the tiles from left to right. A tile tracker is provided which sends Y-coordinates of each rasterized row one or more times to an "xfinder" which is operable to calculate the start and end points on a scanline. A "walker-unit" is responsible for deciding which horizontal tile is currently being rasterized and an "edgetracker" communicates back to the tile tracker the information on how many tiles there are on the current row. A "clip-unit" clips the scanline to the tile and, finally, a "scanline processor" splits the scanlines into 4-pixel packets and calculates the anti-aliasing coverage factor. A rasterizer FIFO is utilized to keep a few scanlines available for the scanline processor, in the event that it requires a few cycles to obtain new scanlines through the pipeline.

The rasterizer 142 also supports scissoring, clipping the primitive to a scissor rectangle, defined by left, top, right and bottom edges. It also allows negative X- and Y-coordinates to be utilized, such that guard-band clipping can be implemented. The X- and Y-coordinates are represented in S14 bit values, allowing the numeric range of −8192 to 8191. The delta values for the non-clipped primitive are also in the same range, such that this limits the guard band to −4096 to 8191. The maximum rendered primitive size is 4096×4096, represented with U12 values in the scanline processor and in the block renderer.

The rasterizer 142 is operable to interface with a color generation stage 146 which is operable to generate four pixels for each operation or process cycle. This will essentially determine what color is associated with a given pixel in the display space. In generating this color, various information such as texture is utilized. This texture information is obtained from one of two texture caches 148 and 150. The texture caches 148 and 150 are interfaced with the MMU 108.

The color generation stage 146, after generating information, feeds it to a frame buffer stage 152 via a frame buffer interface 154. The frame buffer 154 interfaces with the MMU, as well as the frame buffer stage 152. Information is received from the MMU via the frame buffer interface and directly input to the MMU 108 from the frame buffer stage 152.

There are provided four embedded memories 156, 158, 160 and 162 in the illustrated embodiment. Each of these embedded memories is comprised of dynamic random access memory, which is embedded within the integrated circuit 102 and is referred to as "eDRAM." Each of these eDRAMs 156-162 are interfaced with the MMU 108 and are accessible by the 3-D core 104, as will be described in more detail hereinbelow. However, it should be understood that more than four embedded memories can be utilized.

As will be described in more detail hereinbelow, the 3-D core is operable to provide various memory accesses for different operations required during the rendering operation. The 3-D core 104 will access the embedded memory and also the external memory 120, for the operations required thereby. These operations occur substantially simultaneously with each other and are pipelined in an asynchronous manner to allow a request to Write data to be sent to the memory along with the data to be written, and a request-to-Read sent to the memory for return of information therefrom, these requests handled in an asynchronous manner.

Figure 2:
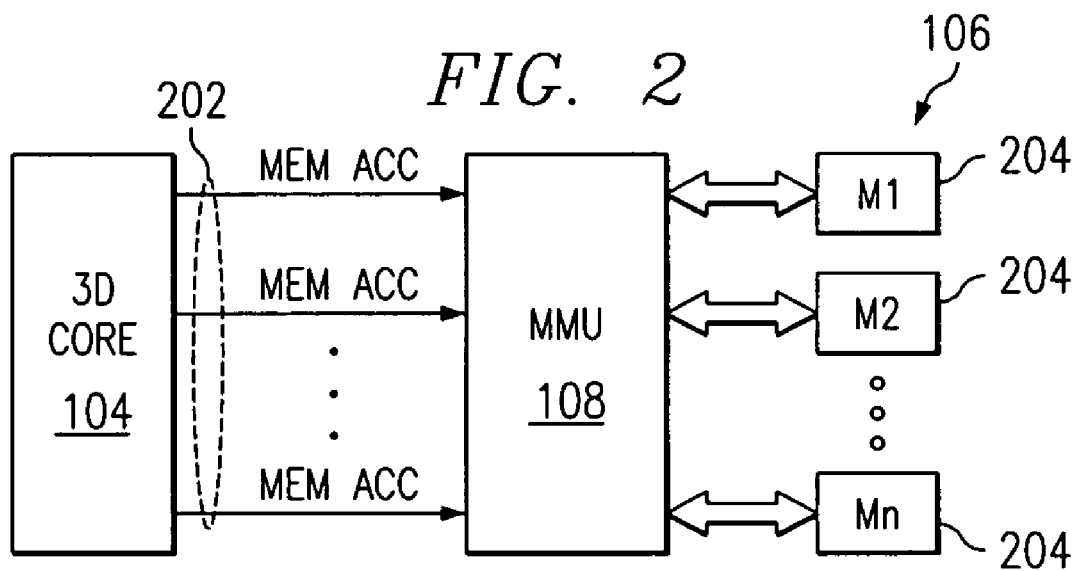
FIG. 2 illustrates a simplified schematic of the combination of the memory with the 3-D core.

Referring now to FIG. 2, there is illustrated a diagrammatic view of the memory access operation. The 3-D core 104 is illustrated as providing a plurality of memory access operations, which were indicated by a plurality of horizontal lines 202 disposed between the 3-D core and the MMU 108. These accesses can be for Read operations or for Write operations. The MMU then interfaces with the memory portion 106 which is comprised of a plurality of memories, indicated as memory blocks 204. These blocks 204 represent the eDRAM memories 156-162 and also the SDRAM memory 120. It should be understood that multiple memory blocks can be accessed in this manner.

Figure 3:
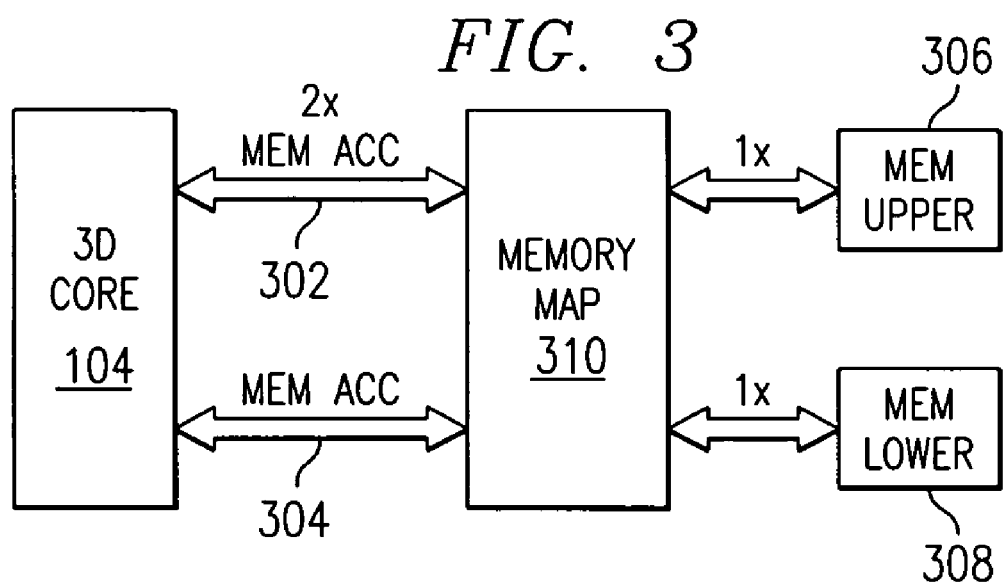
FIG. 3 illustrates a diagrammatic view of the 3-D core interfacing with the memory via a memory map.

Referring now to FIG. 3, there is illustrated an example of a memory access from the 3-D core 104 illustrating two access operations. There is provided a first access operation 302 and a second access operation 304. There are provided two memory blocks 306 and 308 (for illustration purposes, although there could be any number). In between the 3-D core 104 and the memory 306 and 308 is provided a memory mapping function 310. This memory mapping function is provided by the MMU 108, as will be described in more detail hereinbelow. The memory accesses, since there are two, operate at twice the rate of the memory access to each of the memories 306 and 308. Therefore, the accesses can be generated at the same time, accounting for the 2× access rate, with each of the memories being accessed in accordance with the mapping function provided by the memory map 310. It may be that memory access 302 accesses the upper memory 306 and memory access 304 accesses the lower memory 308. Both of these memories could, in that condition, be accessed at the same time. However, the memory map 310 may be configured such that both memory accesses 302 and 304 access the same memory, and as such, the memory accesses would then be pipelined and priority would be determined, since multiple memory accesses can be accommodated, different speed accesses can be facilitated. This is necessary for graphics rendering engines, since the graphics operation is subject to a screen refresh of the screen or display being viewed by the user. Therefore, all necessary processing must be done within a finite length of time.

Figure 4:
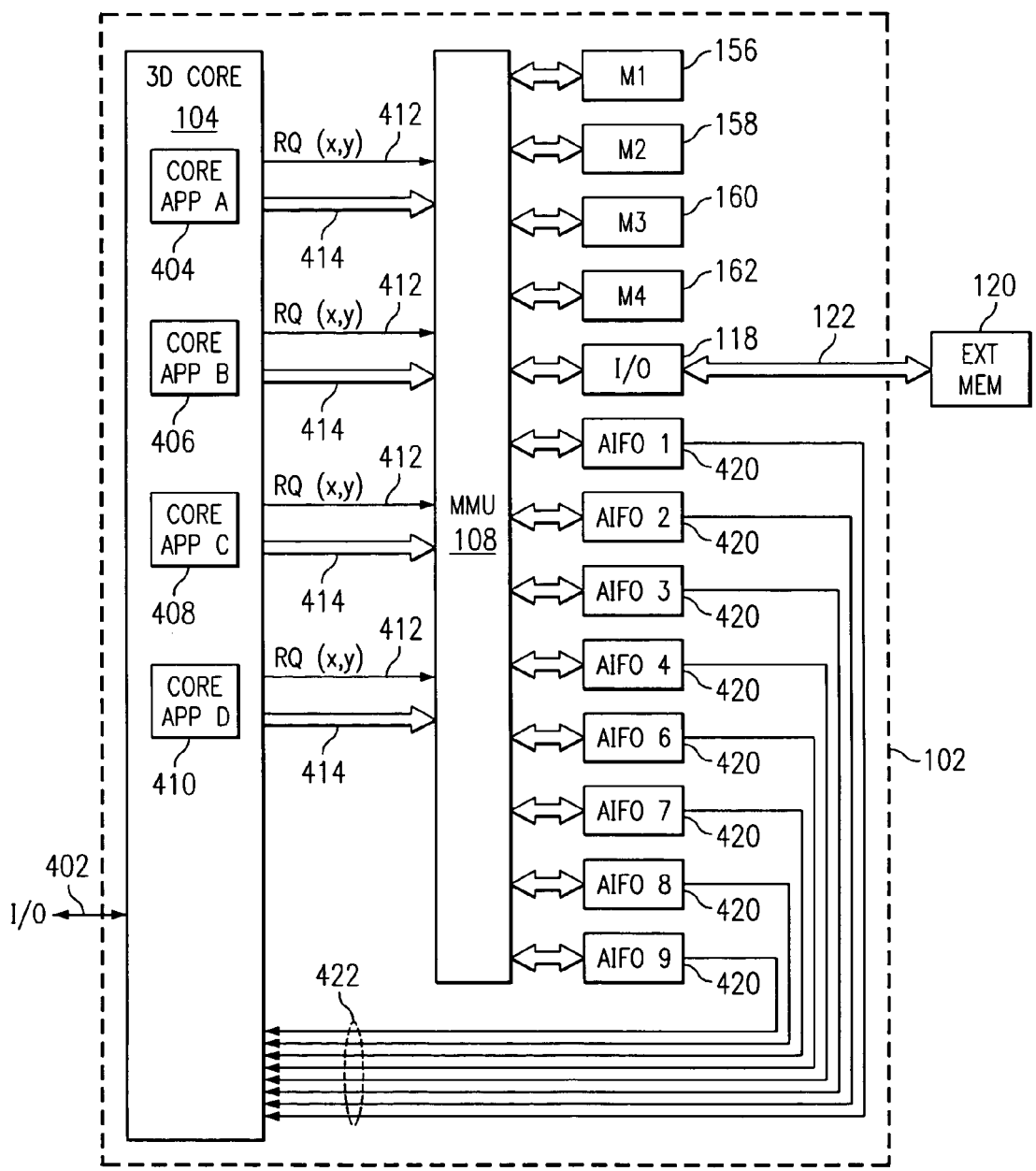
FIG. 4 illustrates an overall diagrammatic view of the graphics integrated circuit of the present disclosure.

Referring now to FIG. 4, there is illustrated a more detailed diagrammatic view of the graphics integrated circuit 102. The 3-D core 104 is operable to receive data via an I/O port 402. There are provided in the 3-D core a plurality of core applications 404, 406, 408 and 410, respectively, labeled core app A, core app B, core app C and core app D. Each of these core applications 404-410, it being recognized that there could be more, are operable to independently generate requests to either Write data to the memory or to Read data therefrom. The request is illustrated by command information that is generated at the core application on a line 412 and data transmitted on a data bus 414. Each of the data buses 414 is operable to carry a 128-bit data value representing 4 pixels of data during a Write operation. Additionally, the data bus 414 will also carry a 24-bit address and a 16-bit enable signal. During a Read operation, the bus 414 will carry an address, a 24-bit value, and a Primitive ID (PID), a 10-bit value. The use of this PID during a Read operation is for steering purposes, as will be described in more detail hereinbelow.

During a Write operation, the request and data is received by the MMU 108. The address represents the native address base of the 3-D core 104, which is comprised of x and y coordinates. The MMU 108 is operable to receive the request in the x-y coordinates and map this to the virtual address space of the memory. Although there are provided multiple blocks of memory, the mapping function of the MMU 108 directs this to the particular area of each of the eDRAMS 156-162 or SRAM 120 as necessary. In a Read operation, the MMU 108 is also operable to receive a request in the form of an x-y coordinate and map the Read request to a particular memory. However, during a Read operation, the data output is directed to one of a plurality of unique FIFO type devices 420, which are referred to as "AIFOs," which stand for an "any-in-first-out device." This will be described in more detail hereinbelow. Each of the AIFOs 420 is operable to receive data and commands from the MMU 108 and provide data output therefrom to the 3-D core 104 on a plurality of buses 422. Each of the buses 422 carries 128 bits of data and, in the present disclosure, is comprised of four 32-bit buses.

As will be described in more detail hereinbelow, each of the requests is processed in a pipelined manner and proceeds through many stages of elastic storage buffers, FIFOs. As such, there will be a plurality of Read pointers and Write pointers associated with each elastic storage buffer and also signals representing the availability of data and capacity status, i.e., whether it is full or there is a memory location available. With the use of the elastic storage, the pipelining can therefore be somewhat asynchronous. Further, as will be described hereinbelow, the AIFOs will provide the ability to input the data in a location in a sequence, with the sequence predetermined. In that predetermined sequence, the data will be pulled out in a predetermined manner, but the input can be a random access input. Therefore, the inputs of the AIFOs 420 will be random access, whereas the output is sequentially accessed.

Figure 5:
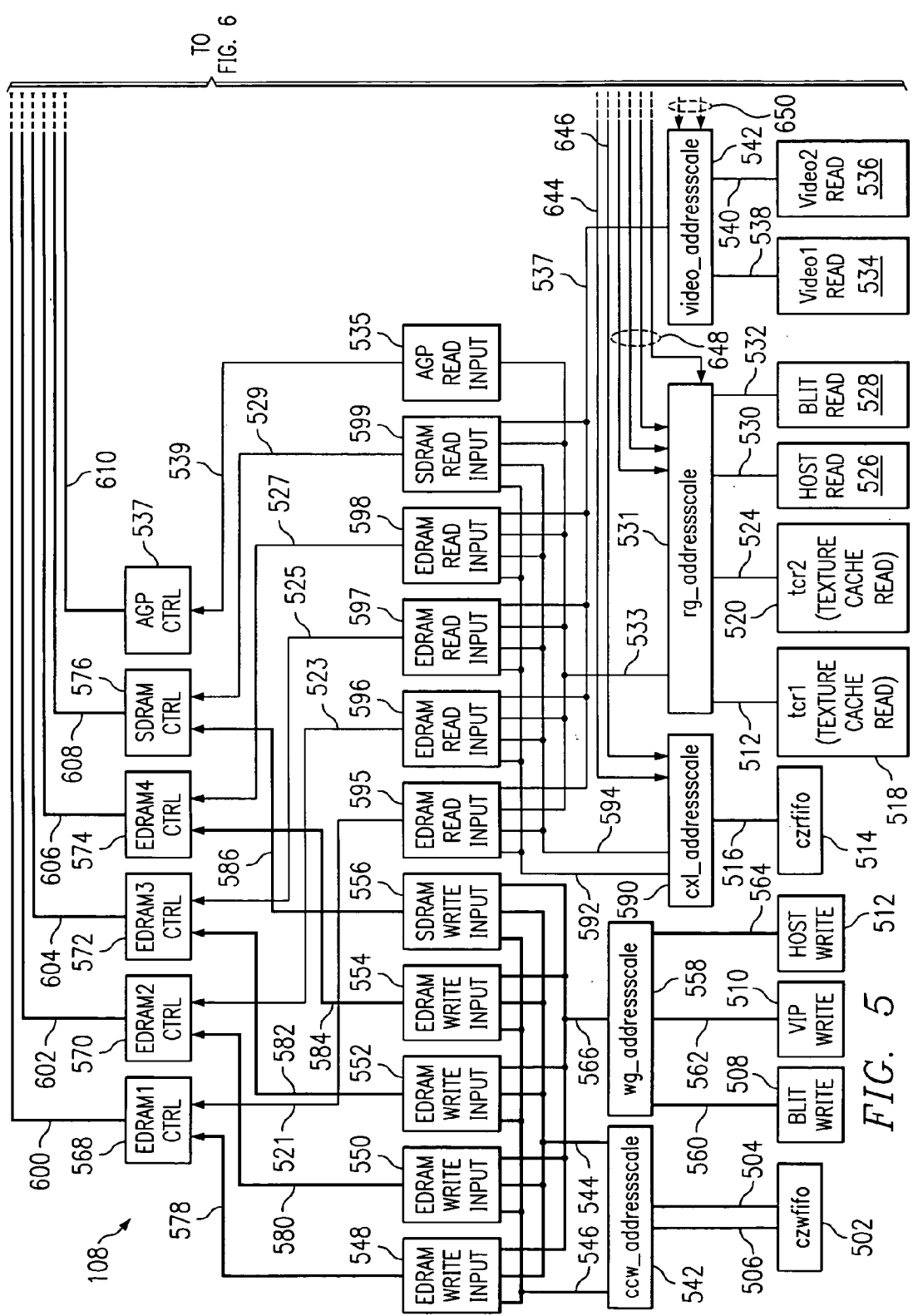
FIGS. 5 and 6 illustrate a diagrammatic view of the memory management unit.
Figure 6:
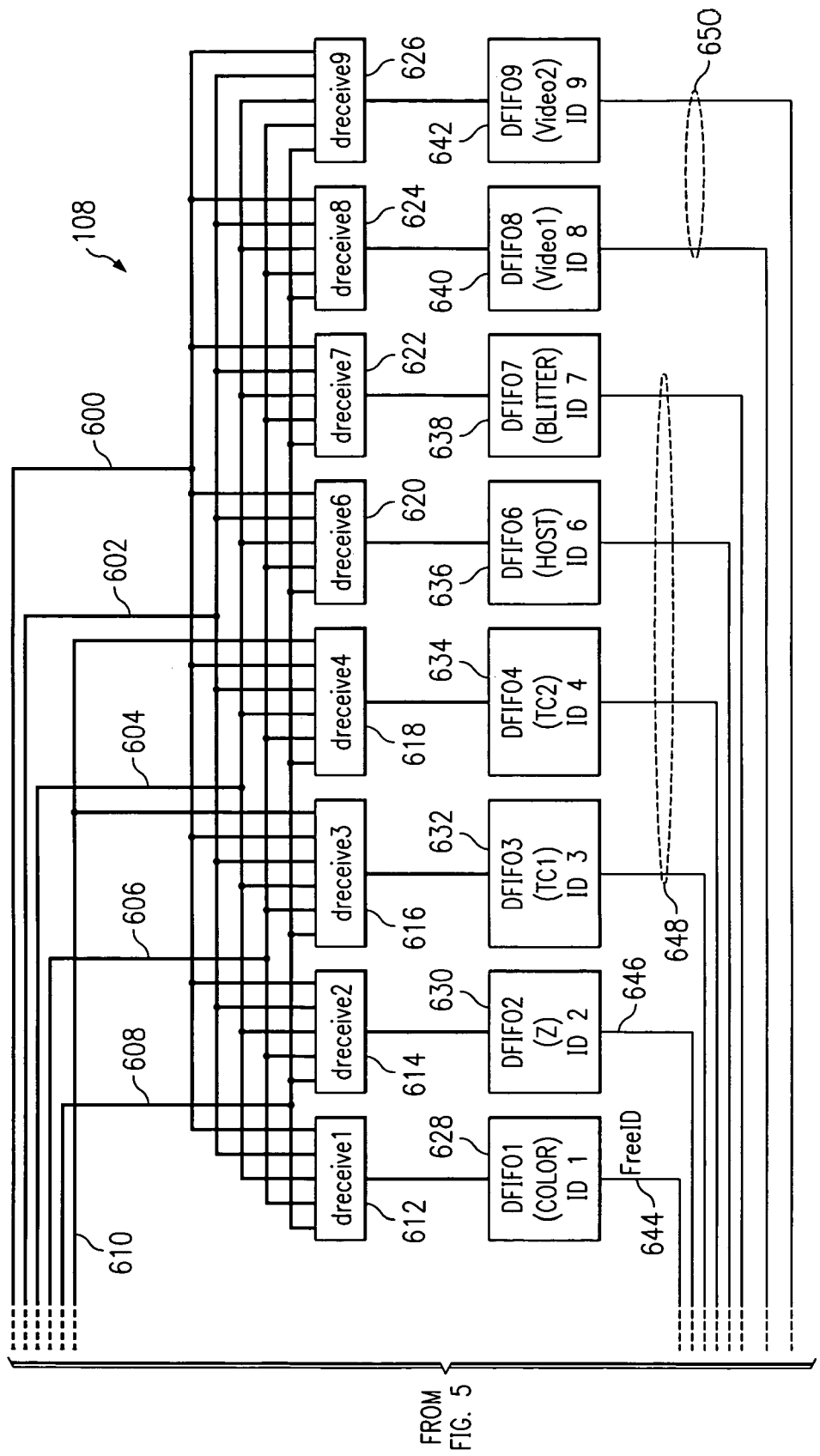

Referring now to FIGS. 5 and 6, there is illustrated a detailed diagrammatic view of the MMU 108. The embodiment of FIG. 5 is directed toward the portion of the MMU 108 for mapping the address from the 3-D core 104 to the memory portion 106 and for writing data to the memory, in addition to generating the Read instructions. The portion of the MMU 108 that is illustrated in FIG. 6 is directed toward the data receive portion of the MMU 108.

With specific reference to FIG. 5, there are illustrated a plurality of input FIFOs. Each of these FIFOs is associated with a different function associated with a number of accesses from the 3-D core 104. There is provided a Write FIFO 502 that is provided for receiving information from the 3-D core 104 that is associated with writing of the color value and the Z-value. The color value is a 128-bit length word associated with 4 pixels. Similarly, the Z-value is also a 128-bit word associated with four pixels. As described hereinabove, each of the pixels is 32-bits in length, representing four 8-bit words (a byte), one for each color.

The output of the FIFO 502 provides two outputs, a first output 504 and a second output 506, one for the color value and one for the X-value. There are also provided three group Write buffers, a buffer 508 for the BLIT Write, a buffer 510 for the VIP Write operation, and a buffer 512 for a Host Write operation. These buffers, FIFO 502, and buffers 508, 510 and 512, constitute the Write portion of the memory access. The Read portion is provided by FIFOs and buffers also. A FIFO 514 is provided for the color and Z-value Read operation and provides a single address output 516. There are provided two texture cache Read buffers 518 and 520 for texture cache 1 (tcr1) and texture cache 2 (tcr2) for a Read operation. The output of buffer 518 is provided on a bus 522, the output of buffer 520 is provided on output 524, it being recognized that these are addresses. As described hereinabove, these addresses are not necessarily in the address space of the memories, as they must be mapped thereto. Typically, these will be in the X-Y coordinate system of the display. There are also provided two buffers 526 and 528 for the Host Read and the BLIT operations, having respective output buses 530 and 532. There are also provided two buffers for a video Read operation, buffers 534 and 536, having output address buses 538 and 540.

The Write operations are associated with different mapping operations. Each of the mapping operations for either the Write or the Read operations are provided by address calculators (ACALC), which are operable to provide specific mapping for a specific function. The FIFO 502 for the color and Z-values has associated therewith ACALC block 542 which is operable to map the color and Z-values to the memory space of the eDRAM and is operable to receive the output of the FIFO 502 on buses 504 and 506 and provide appropriate mapping as will be described hereinbelow. This Write mapping maps the X- and Y-coordinates to a specific location in memory in a predetermined manner depending upon the operation that is being performed during the rendering operation. The information on the buses 504 and 506 constitutes 128-bit data words in addition to the X-, Y-coordinate address. This is converted into respective address/data couplets on buses 544 and 546 output from ACALC block 542. The Write buses 544 and 546 contain a 128-bit data word, and an associated 24-bit address and an associated 16-bit write enable signal. For each of the memories 156-162 and the external memory 120, there are provided respective Write buffers 548, 550, 552, 554 and 556, respectively. The bus 546 is connected to each of the Write input buffers 548-560 on a single input and the bus 544 is connected to each of the Write input buffers 548-556 by separate inputs.

The buffers 508-512 are each input to a group ACALC block 558 by buses 560, 562 and 564, each of the buses 560-564 carrying the x- and y-coordinates of the pixel information, in addition to the 128-bit 4-pixel information. The ACALC 558 is operable to calculate the address in the memory space of the eDRAM and output this on a bus 566 to each of the Write input buffers 548-556 on a separate input. Although there are illustrated three inputs to each of the Write buffers 548-556, it should be understood that each of the input buffers could have a separate input and a separate ACALC block, as is also the situation with the ACALC block 542, which could be divided into two ACALC blocks, one for the color and one for the Z-values. In general, the ACALC blocks 542 and 558 and the Write buffers 548 and 556 all incorporate, in addition to the memory mapping functionality, elastic storage buffers in the form of FIFOs and such.

Each of the Write buffers 548-556 is connected to a memory and control block for the respective memories 156-162 and the external SDRAM memory 120. These are represented by reference numerals 568, 570, 572, 574 and 576. Each of the Write buffers 548-556 provide the outputs therefrom on respective *data/address/control buses 578, 580, 582, 584 and 586, respectively. Each of the blocks 568-576 is comprised of a controller for interfacing with the associated memory. This will be described in more detail hereinbelow.

In operation, data to be written to the memory is received by the respective ACALC block, and mapped to the appropriate location, i.e., the address in the virtual address space of the memories is determined. This information is then input to all of the Write input blocks 548-556, but directed to a particular one of the memories 156-162 and 120. The eDRAM Write buffers 548-556 will determine which buffer handles the received input directed or mapped to the appropriate location in the appropriate one of the memory blocks. By utilizing the elastic storage, multiple inputs can be received and be handled by the Write buffers 548-556. This is a pipelining operation and, therefore, once one location is written, the next location can be written.

In the Read operation, the color value and Z-value FIFO 514 is associated with a Read ACALC block 590 which is operable to generate the address for the appropriate memory location in virtual memory space as determined to be associated with the X- and Y-coordinates of the address bus 516 by the ACALC block 590. The ACALC block 590 will provide on two output address buses 592 and 594 addresses for the respective color and Z-values. This information will contain both a 24-bit address in the virtual memory space of the memories and also a 10-bit primitive ID (PID). This PID will define the "destination" of the data after it has been accessed, whereas the address defines the location of the desired information within the virtual memory space of the memories.

Each of these buses 592 and 594 is input to one of five Read buffers 595, 596, 597, 598 and 599, respectively. Each of the Read buffers 595-599 are connected by respective buses 521, 523, 525, 527 and 529 to the inputs of respective memory/control blocks 568-576. Each of the buses 521, 523, 525, 527 and 529 carry both address and PID information.

The buffers 518-528 are all grouped together and are input into a single group ACALC block 531 which is operable to generate the mapped address for all of the buffers 518-528 and associated functions to the appropriate address in the memory space and output this on a bus 533 in the form of an address and a PID. This bus 533 is input to each of the Read buffers 595-599. This is a pipelined operation, such that each of the buffers 518-528 could be associated with a separate ACALC and a separate input bus to the buffers 595-599. This, again, is a pipelined operation that utilizes various elastic storage buffers in the pipeline. The bus 533, in addition to being input to the Read buffers 595-599, is also input to an AGP Read buffer 535, which is input to an AGP memory/control block 537. This is for storage of AGP information in the memory space for reading therefrom.

Each of the memory/control blocks 568-576 and 537 are each operable to have information written thereto and read therefrom. However, on the Read operation, the data read therefrom is output on a separate bus. Control block 568 has a Read bus 600 associated therewith, control block 570 has a Read bus 602 associated therewith, control block 572 has a Read bus 604 associated therewith, control block 574 has a Read bus 606 associated therewith, control block 576 has a Read bus 608 associated therewith and control block 537 has a Read bus 610 associated therewith. Each of the Read buses 600-610 carries the data that is read from the memories 156-162 and 120 associated with the memory/control blocks 568-576 and 537, respectively, and is also operable to transmit the 10-bit PID. This PID, as will be described in more detail hereinbelow, provides the "steering" for the output data, such that the data is eventually output to one of the AIFOs 420, as described hereinabove with respect to FIG. 4.

Referring specifically to FIG. 6, there is illustrated the Read output portion of the MMU 108, including the AIFOs 420. Each of the buses 600-608 are connected to respective inputs of eight data receivers, 612, 614, 616, 618, 620, 622, 624 and 626. Each of the data receivers 612-626 is operable to receive the address and PID. Each PID has two fields associated therewith, one field for the respective data receiver, and the second field for AIFO 420, as will be described hereinbelow. With respect to the first field, this determines which of the data receivers 612 will actually receive the data transmitted from the respective memory. In addition, the bus 610 is connected to one input of the data receivers 616 and 618, these associated with the texture cache operation.

Each of the data receivers 612-626 is connected to the data input of one of the AIFOs 420. These are labeled as data FIFOs (DFIFOs), these beings referred to by reference numerals 628, 630, 632, 634, 636, 638, 640 and 642, associated with the respective ones of the data receivers 612-626. DFIFO 628 is associated with the color data and has an ID of "1," DFIFO 630 is associated with the Z-value and has an ID of "2," DFIFO 632 and DFIFO 634 are associated with the texture cache operation and have IDS of "3" and "4," DFIFO 636 is associated with the host operation and has an ID of "6," DFIFO 638 is associated with the BLITTER operation and has an ID of "7" and is associated with the 2-D operation, DFIFO 640 is associated with the video operation and has an ID of "8" and DFIFO 642 is associated with a second video operation that has an ID of "9."

Each of the DFIFOs 628-642 has an associated signal line output therefrom indicating that data is available. The DFIFO 620s and 630 have data available output lines 644 and 646, respectively, and are input to the ACALC block 590 associated with the Read mapping operation for the color and Z-values. The DFIFOs 636-638 each have an output line indicating the availability of a data location, on lines 648, which are input to the ACALC block 531 associated with the group Read operation, as described hereinabove with respect to FIG. 5. The DFIFOs 640 and 642 have associated therewith two output lines, one for each of the DFIFOs 640 and 642, indicating the availability of a data location therein, on lines 650. Each of the data available lines indicates that a data location is available for storing information therein. When information is received by a respective one of the ACALC blocks during a Read operation, the respective ACALC block is operable to map this particular operation through to the destination one of the AIFOs 420. However, before this request is "serviced" and placed into the pipeline, a determination has to be made that there is an available location for storage therein. As will be described hereinbelow, the process pipeline is 32 cycles long, such that 32 requests can be serviced for data to be written to the memories or read therefrom. If all of the processes in the pipeline are Read operations and all the Read operations are directed toward a particular one of the AIFOs 420, it is important that the AIFOs 420 are "deeper" than the process pipeline. Therefore, if more requests come in than the pipeline is long, these requests are held until at least a free memory location in the AIFO 420 can be cleared out by a Read operation therefrom.

Figure 7B:
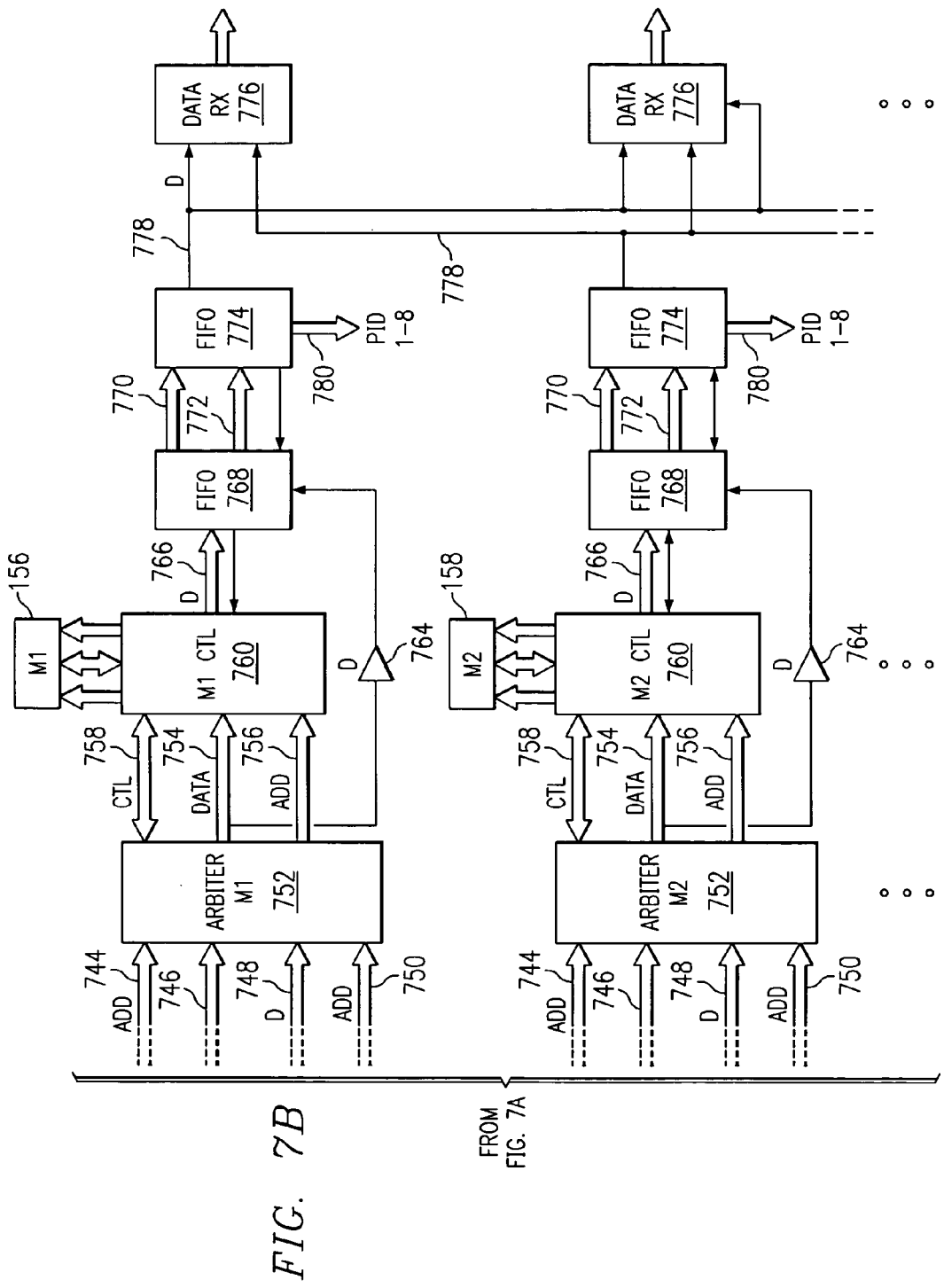

Referring now to FIGS. 7A and 7B, there is illustrated a detailed logic diagram for the data flow path for both the Read and the Write operation to the data receivers. There is illustrated one Write FIFO 702 and one Read FIFO 704. The Write FIFO 702 is operable to receive four 32-bit data words representing four pixels on four separate data buses 706, with the address being received on an address bus 708, a 24-bit wide bus. The Write FIFO 702 is operable to assemble the data into a single 128-bit word (4 pixels) and output this on a data bus 710. Similarly, the address is provided on an address bus 712. The x-y coordinates are output from the Write FIFO 702 on a 24-bit bus 713. The X- and Y-coordinates are received by FIFO 702 on a bus 709, which is a 22-bit data bus, 10 bits for the X value and 12 bits for the Y value.

Similarly, the Read FIFO 704 is operable to receive the base address, a 24-bit value, on an address bus 714 and the X- and Y-coordinates on a 22-bit bus 716. The output of the Read FIFO 704 is provided as a 24-bit base address on a bus 716 and the X- and Y-coordinates on a bus 718.

The buses 710, 712 and 713 from the Write FIFO 702 are input to an appropriate Write address calculation block 720 which is operable to map these addresses from the x-y coordinates to the appropriate address of the eDRAMs and then routed to the Write or Read buffers. The Write ACALC block 720 has associated therewith elastic storage locations therein and is operable to receive from the AIFOs 420 on the data available signal or signal lines 644, 646, 648 or 650 and a Next signal on a signal line 722. The Write ACALC block 720 is operable to output data on a 128-bit bus 724 and address information on a 24-bit address bus 726. In addition, a memory select output 728 is provided, which is a signal representing which of the Write buffers 548-556 will receive the data and address, i.e., which one of the paths for the associated memory will be enabled to read the data and the address.

The output of the FIFO 704 on the buses 716 and 718 is input to a Read ACALC block 730, which is operable to perform the memory mapping operation. The 24-bit address on bus 716 and the X- and Y-coordinates on bus 718 will be converted or mapped into the virtual memory space and an address provided on a bus 732, a 24-bit bus. The PID for the particular Read operation is also generated on an ID bus 734. As was the case with the Write ACALC block 720, a memory select is output on a 5-bit bus 736. This will select which of the Read buffers the address is directed toward. Note that this is independent of the PID on bus 734, which is utilized to direct the retrieved data from any of the memories to a select one of the data receivers and also a select location within the associated one of the AIFOs 420.

There are illustrated two memory paths in FIG. 7. The first memory path is that associated with memory M1 (156) and the second is associated with memory M2 (158). Each of the paths have associated therewith a Read buffer 740 and a Write buffer 742. The Read buffers are operable to all receive the PID information on bus 734 and the address information on bus 732. Note that, in the pipeline, each data transfer from one block to the other will typically involve FIFOs. This will typically require some intercommunication between the FIFOs to indicate that a memory location is available and that data is available on the transmitting end. These are not illustrated for simplicity purposes.

The Read buffers are operable to output the address on an address bus 742 and the PID information on a bus 744. It is important to note that there is provided a Read buffer associated with each input path of the buffer 702 and the buffer 704. As noted hereinabove, each bus coming out of any of the ACALCs is associated with one input on the Read buffer for an associated memory path. Therefore, there would be three Read buffers 740 provided for the memory path associated with memory M1 (156). Similarly, there would be provided three Write buffers 742. Only one is illustrated for simplicity purposes. The output of the Write buffer 742 provides a data output on a bus 748 and an address bus 750.

The output of the Read buffer and Write buffer 740 for each of the memory paths is input to an arbiter 752. The arbiter 752 is operable to determine priority from the multiple inputs thereto, it being understood that multiple Read addresses and PIDs will be received for the different Read buffers 740 associated therewith and multiple Write operations will be operable to be received and serviced thereby from the multiple Write buffers 742 associated therewith. The arbiter 752 determines the priority of which of these operations are to be handled, and forwards them on a single data bus 754, a single address bus 756 and a single control bus 758 to a memory controller 760. The memory controller 760 is interfaced with the respective one of the memories 156-162 and 120, it being noted that there is provided an arbiter 752 and memory control block 760 for each of the memories. These buses 754-758 represent one of the buses 578-586 in FIG. 5. Additionally, the Write buffers 548-556 and the Read buffers 595-599 and 535 are represented by the combination of the Read buffer 740, Write buffer 742 and the arbiter 752. As such, the buses 754-756 represent the Read buses 521-529 and 539, respectively, with the exception that the data bus carries the PID information during a Read operation.

The memory controller 760 is operable to interface with the associated one of the memories 156-162 and 120 via data, address and control buses, with the exception that the memory 120 is actually interfaceable through the I/O 118 (not shown.) The memory controller 760 includes the circuitry for processing the PID, which is illustrated as being passed around the memory controller through a delay block 764, illustrating that three cycles are required in order to process the Read data. The reason for this is that it takes approximately three cycles to access the data and provide it for output from the memory controller 760. The PID is therefore passed out with the data after a three cycle delay. This data is provided on an output data bus 766 to a FIFO 768. The FIFO 768 is also operable to receive the PID information from the delay block 764, this being a 10-bit word. The FIFO 768 is inoperable to output the PID information on a bus 770 and the data on a bus 772. These buses 768 and 770 are input to an output distribution FIFO 774, which is operable to distribute the data to one of a plurality of the data receivers 612-626, represented by a block 776. Each of the FIFOs 774 provides on the output thereof a single data bus 778, which is connected to one input of each of the data receivers 776, each of the data receivers 776 operable to interface with data bus 778 for each of the FIFOs 774 for each of the memory data paths. Each of the FIFOs 774 also has to provide from the output thereof a PID on a PID bus 780, which is a 10-bit bus. This is provided to each of the data receivers 776, wherein the first four bits of the PID indicate which of the data receivers is to receive the data. The data receiver 776 has associated therewith on the input for each of the FIFOs 774 an elastic storage region, such that data will not be transferred to the associated data receiver 776 until a signal is received therefrom. Each of the FIFOs 774 will provide on the output thereof (not shown) a data available signal and will receive a Next signal from each of the data receivers 776. The FIFOs 774 will be able to determine how much data can be stored therein, depending upon whether data can be output therefrom. The arbiter stage determines whether the Read data associated with a particular memory location is to be directed to the associated memory. If it is to be directed to the associated memory, the arbiter 752 will service that request and address, and then pass it through to the FIFO 774 for "steering" thereof in accordance with the first field and the PID.

Figure 8:
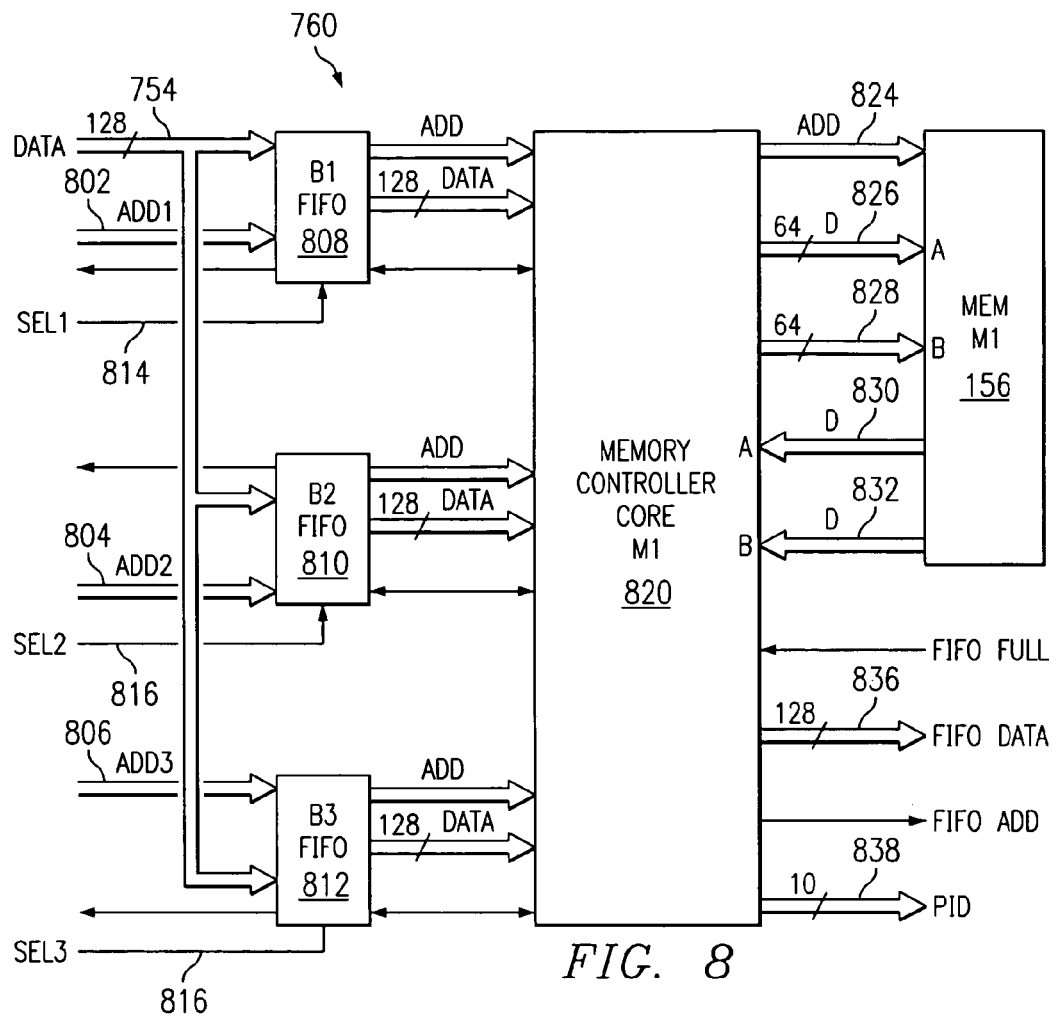
FIG. 8 illustrates a more detailed diagrammatic view of the memory and the memory controller.

Referring now to FIG. 8, there is illustrated a more detailed diagrammatic view of the memory controller 760. The arbiter 752 is operable to pass the 128-bit data through on the data bus 754. However, the address illustrated as being output on address bus 756 is output as row and column address, the row address being a 9-bit address and the column address being a 7-bit address. Further, the arbiter is operable to divide the memory into three different banks, such that the arbiter 752 will provide three different addresses, ADD 1 on a bus 802, ADD 2 on a bus 804 and ADD 3 on a bus 806. The data bus and each of the address bus 802, 804 and 806 are input to three respective banks of FIFOs 808, 810 and 812. Bank 1 is associated with the FIFO 808, Bank 2 is associated with FIFO 810 and FIFO 810 is associated with Bank 3. Each of the banks 808 is selected by a separate select input 814, 816 and 818, respectively, which is generally divided arbiter 752. Each of the FIFOs 808-812 provides a feedback to the arbiter 752 indicating that a memory location is available.

Each of the FIFOs 808-812 is operable to output the stored data to a memory controller core 820 which is operable to receive an elastically store the contents of the FIFOs 808-812. The information that is passed from the arbiter 752 through the FIFOs 808-812 to the controller core 820 are the row and column data for addressing purposes, the 128-bit data, the 16-byte Write enable signal and also a Type signal, indicating whether this is a Read or Write operation. The base address that addresses the arbiter is converted to the row and column data in a predecode operation. The arbiter 752 will recognize where in the virtual memory space the arbiter exists, recognizing that each of the memories 156-162 and 120 occupy a defined portion of the virtual memory space. Once this is recognized, then the portion of the address associated with the memory will be "stripped" off. In addition, the arbiter selects which of the banks 808-812 will be selected in a further predecoding operation. The banks 808-812 allow three accesses to occur to the banks, which can then be input to the memory controller.

The memory controller core 820 is operable to elastically store the information from the banks 808-812 and then access the memory M1 (156), in this example. The memory 156, in the disclosed embodiment, includes two banks. Therefore, an address in the form of the row and column information requiring a 9-bit row address and a 7-bit column address, is output on a bus 824 to the memory 156. The memory 156 will then receive data on two data buses, a 64-bit data bus 826 and a 64-bit data bus 828. These data buses are input to the two separate banks. Read data will come back on separate data buses, a data bus 830 and a data bus 832. During a Read operation, the core 820 is operable to combine the two 64-bit data fields into a single 128-bit data field for output on a 128-bit data bus 128. The PID information is output on a data bus 838, data bus 838 and 836 comprising the data bus 600 in FIG. 5.

Figure 9:
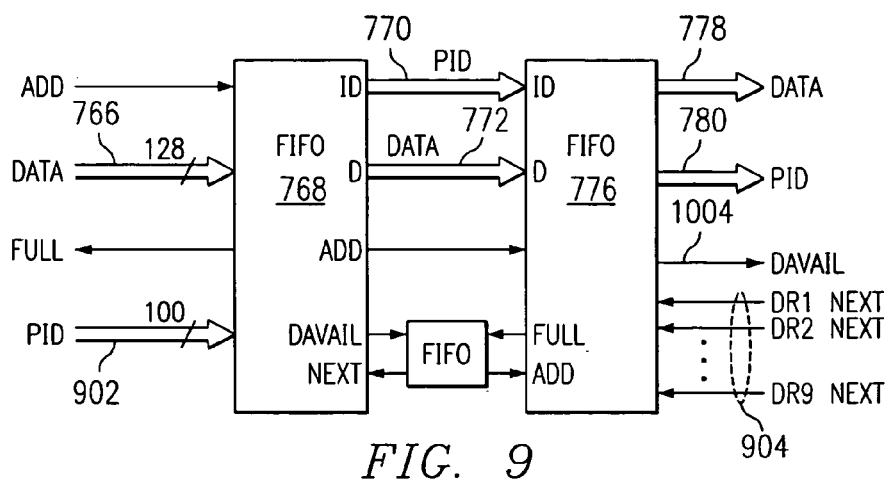
FIG. 9 illustrates a diagrammatic view of the output Read FIFO.

Referring now to FIG. 9, there is illustrated a more detailed diagrammatic view of the FIFOs 768 and 774 for receiving the output of the controller 760 and steering the data to the appropriate data receiver. The FIFO 768 is operable to receive the data on the bus 766 and the PID information on a bus 902. The output data is provided on a bus 772 with the PID information provided on a 10-bit bus 770. The FIFO 776 is operable to interface with the FIFO 768 to indicate that it is full and also to receive information as to whether data is available. The output of the FIFO 776 provides data on a bus 778, this data provided to each of the data receivers 776. Additionally, the PID information is sent to each of the data receivers 776 on a separate bus 780, there being a separate data bus 778 and a separate PID bus 780 for each of the FIFOs 776 for each of the memories. In addition, each of the data receivers 776 is operable to provide on an associated signal line 904 information regarding the availability of a storage location therein.

Referring now to FIG. 10, there is illustrated a diagrammatic view of a data receiver 1002. Data receiver 1002, as described hereinabove, is operable to receive from each of the FIFOs 776 data, PID information and a data available signal on a line 1004. The Next signal is output on signal line 904. The data receiver 1002 is operable to recognize the four Most Significant Bits (MSBs) and the address thereof. If the address is correct, then data will be received and elastically stored therein for output to the associated AIFO 420. This will be in the form of the 128-bit data and the 6-bit AIFO ID portion of the overall PID, as will be described hereinbelow.

Referring now to FIG. 11, there is illustrated a flow chart for depicting how ACALC blocks assign a PID. As described hereinabove, there are 32 processes that are operable to be stored in the pipeline at any one given time. As such, each time a new process is serviced, the system must determine if the process counter is equal to 32. If so, then the process will not be serviced until at least one of the first services is cleared out of the pipeline. Once cleared out, the process counter is decremented and then a new process is received and the process counter increased. In addition, each time a new process is received, it is assigned a PID for the associated AIFO it is designated for. This PID indicates where in the pipeline sequences that the particular process in that particular AIFO is being serviced. As noted hereinabove, the four most significant bits of the PID indicate the data receiver to which data is to be directed. The remaining 6-bits indicate the position within the portion of the process pipeline that the process is inserted for the associated AIFO. The reason for this will be described hereinbelow. This flow chart is initiated at a start block 1102 and then proceeds to a decision block 1104 to determine if a new memory access has been initiated. If not, the program will return along a loop and wait. When a memory access is received, the program will flow along a "Y" path to a decision block 1106 to determine if the overall process counter is less than a value of 32. If not, this indicates that the pipeline is full and the program will flow to a function block 1108 to wait for the counter to decrease. This will continue in a loop until the counter has been cleared of at least one process and this program will flow along a "Y" path to a function block 1112 wherein the process counter will be incremented and then to a function block 1114 to increment the ID counter. At this point in the process, a PID is assigned to the process, such that it is uniquely identified within the pipeline for an associated AIFO. The flow then proceeds to a function block 1116 to assemble the data and then process it through the pipe line, as described hereinabove, and then the program returns to the input of decision block 1104 of the AIFO Referring now to FIG. 12, there is illustrated a diagrammatic view of the AIFO 420. The AIFO 420 has at the core thereof a plurality of memory registers 1202 that are individually accessible. On the input thereof is provided a Write multiplexer 1204 which is operable to Write into each memory location, based upon an address received on ID bus 1206 and data received on a 128-bit data bus 1208. The address, as described hereinabove, constitutes the six least significant bits of the PID. Therefore, the input to the AIFO core 1202 is a random access input. As such, whenever the data is received, the location thereof is determined by its location within the process. Further, if another process step which was later in the pipeline occurred prior to the current storage operation, this would be stored in a location out of sequence to that normally incurred in a FIFO operation. Additionally, the address bus 1206 is input to a data valid block 1210, which determines if the data at the location addressed by the address bus 1206 has been read out. If not, then the system will not store that data. When data is read out, a reset signal on a line 1214 from a Read control block 1216 will reset the data valid bit. When data is written to a location, the data valid bit is set. This data valid block 1210 provides a Write enable signal to the AIFO. The control for the Write operation is provided by Write control block 1218 which is operable to determine if data is available from the associated data receiver and process that data and, when a location becomes available, a signal can be output to the data receiver indicating that it is ready for the next data value.

During the Read operation, an output multiplexer 1220 is provided for selectively accessing each of the AIFO locations in the core 1202. This is in conjunction with a Read pointer generated by Read control circuit 1216, which is a circulating pointer. Therefore, each location in the core 1202 will be rotated through cyclically. The output multiplexer 1220 receives the 128-bit wide data words, each representing four pixels, and provides on the output thereof four 32-bit words on four data buses 1224. The Read control 1216 interfaces with the Read side of the memory controller 752 to indicate when data is available, i.e., there is data stored therein, and also to receive information when the particular ACALC associated therewith can receive this information.

In the processing sequence, as described hereinabove, a rotating PID counter is provided which has a value from 0 to 32. Of course, it should be understood that there is a requirement for the AIFO to be deeper than the process. When a PID is assigned to the process, this PID is associated with both the data receiver to which the data is steered and also a 6-bit ID for the 32-bit location AIFO. This is a rotating value such that each PID for a given AIFO will have the 6-bit value thereof incremented for each process step generated, there being one PID counter for each AIFO. For example, if the first process is received, it may be assigned the value "24" for one of the AIFOs and the next process received for that AIFO will be the AIFO ID "25." Even though the locations in the AIFO associated with the AIFO IDS 1-15 may be cleared out, leaving location 16-22 full, i.e., associated with a process in the pipeline not yet carried out, the system will still operate in the same sequence, without a reset operation. By doing such, it is possible to actually process the request or memory access associated with the AIFO ID "23" for a given AIFO prior to processing the memory access associated with AIFO ID "15" for that AIFO even though the process associated with AIFO ID "15" for that AIFO was an earlier received process. Note that the ACALC has no knowledge of when and in what order the processes were carried out; rather, the ACALC that requested the memory access requested it in a predetermined order and it expects the data to be output in that order. It defines the order of output by the PID. By providing the random access input to the AIFO, the process can actually be asynchronous to the pipeline order, without reordering the output and apprising the ACALC of the reorder. This in effect prevents the system from "stalling" to process a lower priority or earlier memory access prior to providing the output thereof, which would be the case with a normal FIFO. This allows the processing to handle a process that was later requested prior to an earlier requested memory access, and then essentially reorder them when they are stored in the AIFO.

Figure 13:
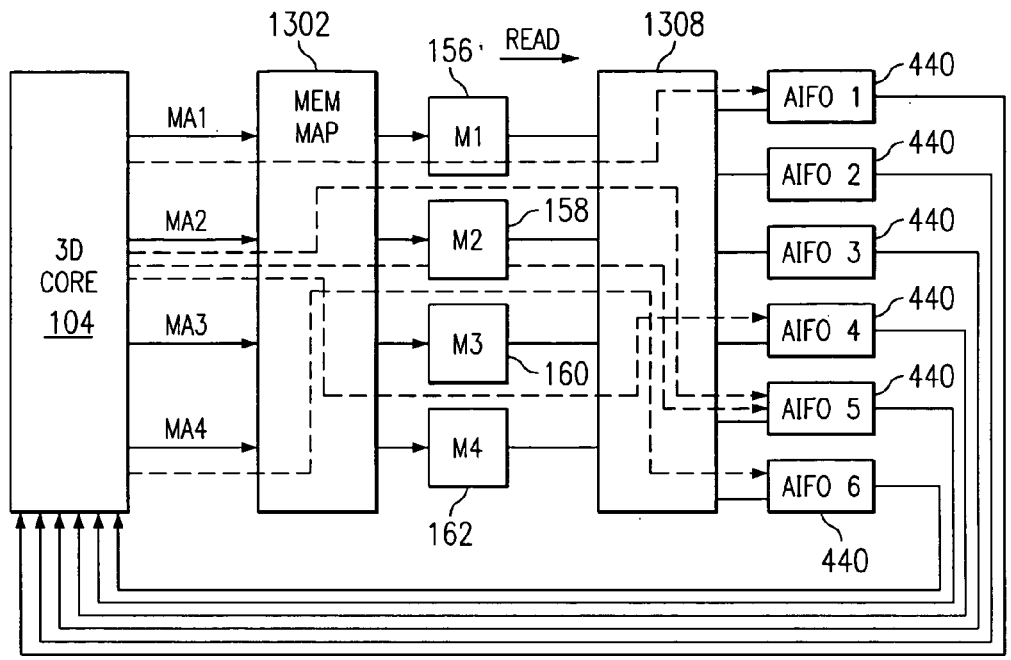
FIG. 13 illustrates a diagrammatic view of the pipelining path through the graphics integrated circuit of the present disclosure.

Referring now to FIG. 13, there is illustrated a diagrammatic view of the overall steering operation. The 3-D core 104 is operable to generate multiple memory accesses, in this example, MA1, MA2, MA3 and MA4. These are input to a memory mapping block 1302, which comprises the ACALC blocks and Read and Write buffers described hereinabove. The memory map 1302 is operable to map these to the particular memory and direct them to the particular memory. Additionally, the memory map block 1302 is operable to order the various accesses, since the memory is linear. Once ordered, the memories 156-162, representing memories M1, M2, M3 and M4 are accessed for a Write operation or a Read operation. The Read operation only proceeds on the Write of the memory 156-162. Write operations terminate thereat.

For Read operation, the data will be output to a separate distribution block 1308 comprised of the data receivers and the various FIFOs 768 and 776. These will receive and handle the output of the associated memory on a given path and distribute them to the appropriate AIFO 440. There are illustrated in this example 6 AIFOs, $AIFO_1$, $AIFO_2$ . . . $AIFO_6$. There are illustrated four memory accesses, which memory accesses are simultaneously generated from the 3-D core 104 to the memory map block 1302 for handling and redirecting. The memory map block 1302 recognizes that the access from MA1 and MA2 are directed toward memory M1. These two memory accesses are directed thereto, but the redistribution block 1308 will steer them to different AIFOs 440. The access MA1 is steered toward $AIFO_1$ and the first access from MA2 is steered through memory M1 to $AIFO_5$. There is also provided a second access from MA2, this being the functional accessing block, that is steered to memory M2. Since this is typically the same function, both memory accesses are accessing different portions of the memory space and can handle a simultaneous access of the two separate memories. However, they must both be directed to the $AIFO_5$. In order to be directed to this $AIFO_5$, the PID must be assigned to indicate the associated data receiver in the four MSBs. However, the AIFO ID will be different and will represent the position in the process for that AIFO wherein the particular accesses were received. It is noted that the process pipeline operation is associated with the AIFO and not the overall process. Therefore, there will be a separate AIFO ID counter for each AIFO.

Continuing on, the memory access MA3 is routed through memory M4 to $AIFO_4$ and a memory access from MA4 is routed through memory M3 to $AIFO_6$. It can be seen that the ACALC blocks will direct the memory access requests to the appropriate memory block, depending upon the address associated therewith in the virtual address space. Once addressed, the data can then be transferred along the appropriate path through the various FIFOs or elastic storage regions. During a Read operation, it is again redirected through the use of the PID to the appropriate output elastic storage device. This can then be returned to the 3-D core via the return buses.

Figure 14:
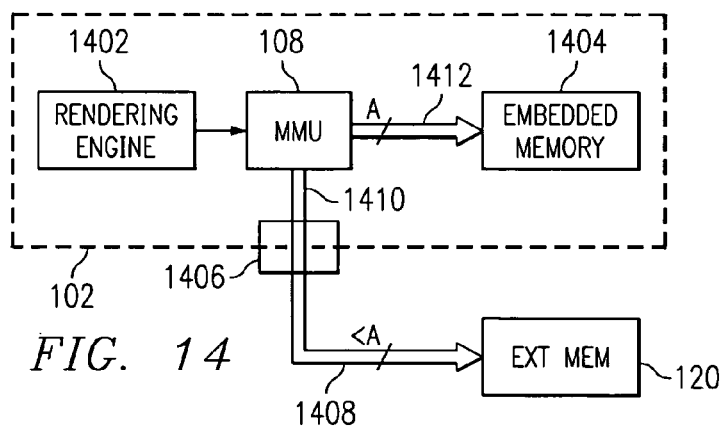
FIG. 14 illustrates a diagrammatic view of an embodiment utilizing external memory and embedded memory.

Referring now to FIG. 14, there is illustrated a diagrammatic view of the overall graphics chip 102 having disposed therein a rendering engine, which forms a portion of the 3D core 104 as a rendering engine 1402. The rendering engine 1402 is operable to generate an address that is mapped to the X and Y coordinates in a given display by the MMU 108 to access embedded memory 1404 in the integrated circuit 102. Additionally, there is provided the external memory 120 that is accessed through an I/O port 1406 which has a data bus 1408 connected from port 1406 to the memory 120 and a data bus 1410 internal to the chip 102 that connects the MMU 108 to the port 1406. Additionally, there is provided an internal bus 1412 that is operable to connect the MMU 108 to the embedded memory 1404. As described hereinabove, the bus 1412 has a first width, noted herein as "A" and the bus 1408 has a width of less than "A." Thus, more data can be forwarded to the embedded memory 1404, due to the wider bus width. This necessarily indicates that data transfer between the MMU 1108 and the embedded memory 1404 will be at a higher rate than the external memory 120.

Figure 15:
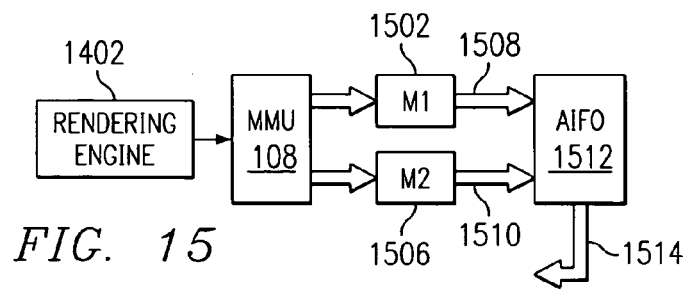
FIG. 15 illustrates an embodiment for selectively organizing the output of multiple memories.

Referring now to FIG. 15, there is illustrated another embodiment of the architecture illustrating the rendering engine 1402 as accessing multiple and discrete memories with the assistance of the MMU 108. These memories are illustrated as being two memories 1502 and 1506, although there could be any number of memories. Each of the memories is independently addressable and accessible such that the information thereof can be output from each of the respective memories 1502 on separate and distinct data buses 1508 and 1510, respectively. These data buses 1508 and 1510 are input to a data organizer 1512, which is the AIFO described hereinabove. This data is organized in a particular pipeline and output on a single bus 1514. Each of the memories 1502 and 1506 can have various requests input thereto and output the data in any order. Both of the memories 1502 and 1506 can be accessed independently.

Figure 16:
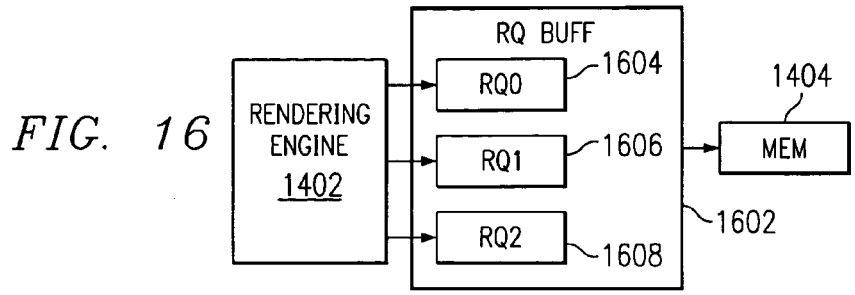
FIG. 16 illustrates a diagrammatic view of an architecture for handling multiple requests to a memory.

Referring now to FIG. 16, there is illustrated a diagrammatic view of an architecture wherein the rendering engine 1402 is operable to generate multiple memory requests which are then input to a request buffer 1602 as separate and distinct requests, there being illustrated three separate requests 1604, 1606 and 1608 in the request buffer 1602. These requests are then handled in a predetermined order as determined by the MMU 108 and the associated arbiter (not shown) for output to the memory 1404.

Figure 17:
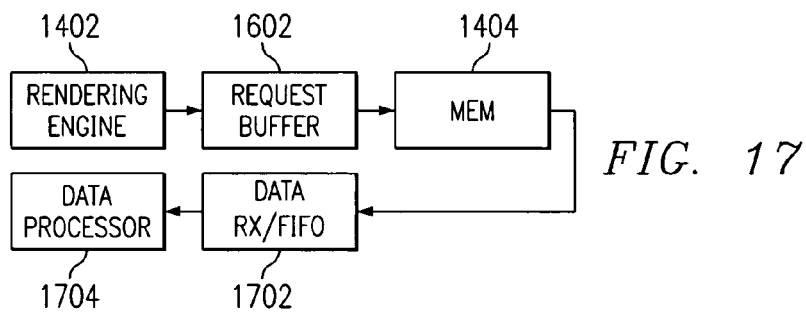
FIG. 17 illustrates a diagrammatic view of an embodiment illustrating the operation of buffering requests to a memory and then processing the output thereof.

Referring now to FIG. 17, there is illustrated a simplified diagram of the manner of handling the request. The rendering engine 1402 is operable to, again, output requests to the request buffer 1602 which then accesses the memory 1404 in the predetermined sequence that the requests were received, it being understood that the requests may be received in an order that can be different than the logical pipeline and potentially different than the actual order in which they are executed. The output data is then forwarded to a data receiver/FIFO 1702 for buffering the data and then subsequently forwarded to a data processor 1704. The buffering of the requests allows the pipeline to be more efficiently handled.

Figure 18:
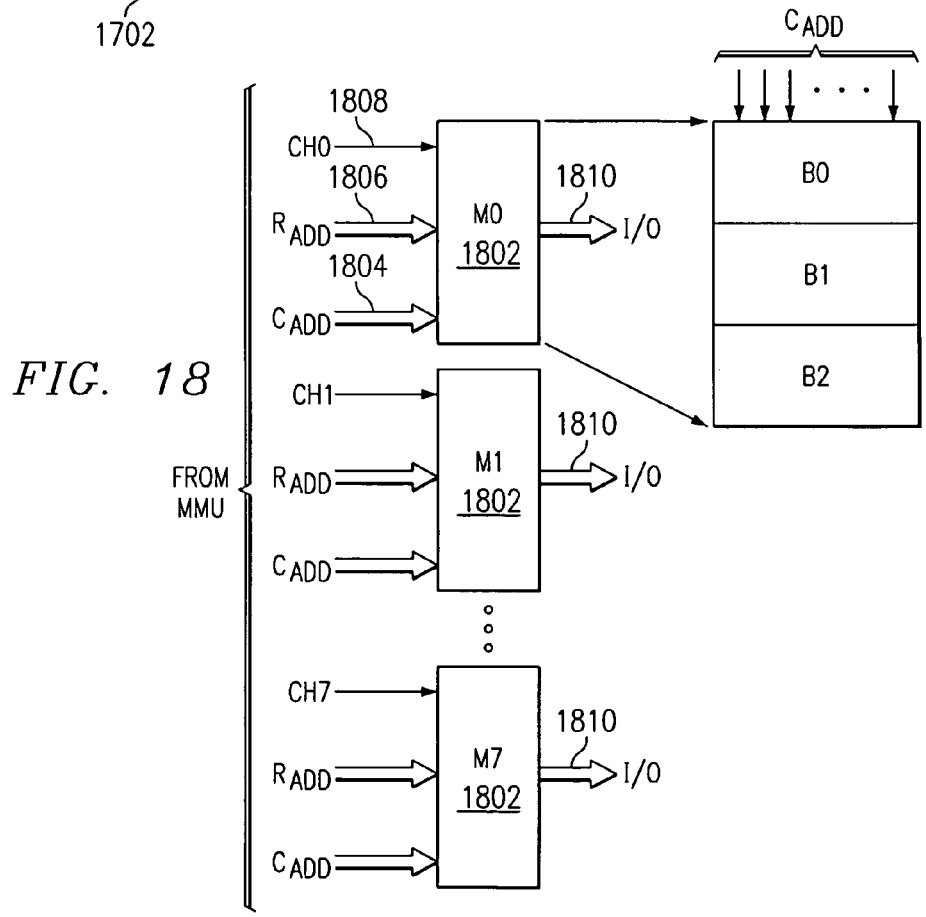
FIG. 18 illustrates a diagrammatic view of the multiple memory modules and the organization of data therein.

Referring now to FIG. 18, there is illustrated a diagrammatic view of the embedded memory and the organization thereof. This illustration will be utilized for describing how data is written to and read from memory during an update of a display. There are illustrated eight separate memory devices 1802. These are essentially the embedded memory blocks referred to in FIG. 1 as eDRAM 156-162. Although there were only four eDRAMs illustrated in FIG. 1, there are eight in this embodiment, these labeled M0, M1, . . . M7. Each of the memories 1802 is separately accessible and addressable. They each have a common address input 1804, a row address input 1806 and an enable line 1808. Each of the memories 1802 is referred to as a "Channel." There are eight memories and, therefore, eight channels labeled CH0, CH1, . . . CH7. The MMU 108 can separately address each memory with a row and column address and separately enable each memory. Each memory 1802 also has a separate data output 1810.

Each of the memories 1802 is divided into three banks, B0, B1 and B2 with each bank having the columns thereof separately addressed. The banks in each of the memories are organized such that they are partitioned into the three banks with a defined "0" for each. As such, there will be a row address and a bank address that defines the actual address within the particular memory 1802. The bank address is a partitioning address within the given memory.

Figure 19:
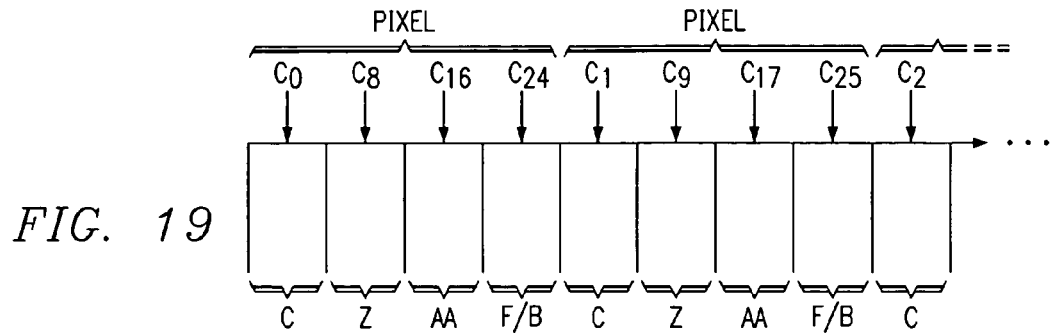
FIG. 19 illustrates a diagrammatic view of the way in which columns are laid out.

Referring now to FIG. 19, there is illustrated a diagrammatic view of how the column addresses are organized. As will be described hereinbelow, there are four planes for each pixel, the color plane, the Z-value plane, the antialiasing (AA) plane and the Front/Back (F/B) buffer plane. There are provided in the memory 64 columns of addressable locations, each addressable location comprised of 32 bits. Each pixel has four planes for a maximum of 128 bits. The first color plane is associated with the column addresses $C_0$-$C_7$, the Z-value plane associated with the column addresses $C_8$-$C_{15}$, the AA plane associated with the column addresses $C_{16}$-$C_{23}$ and F/B plane associated with column addresses $C_{24}$-$C_{31}$. However, the columns are arranged such that, for each pixel, the first column address in each of the planes are disposed adjacent to each other. For example, column $C_0$, $C_8$, $C_{16}$ and $C_{24}$ are disposed adjacent each other in the first group, with the next group being column addresses $C_1$, $C_9$, $C_{,7}$ and $C_{25}$.

Figure 20:
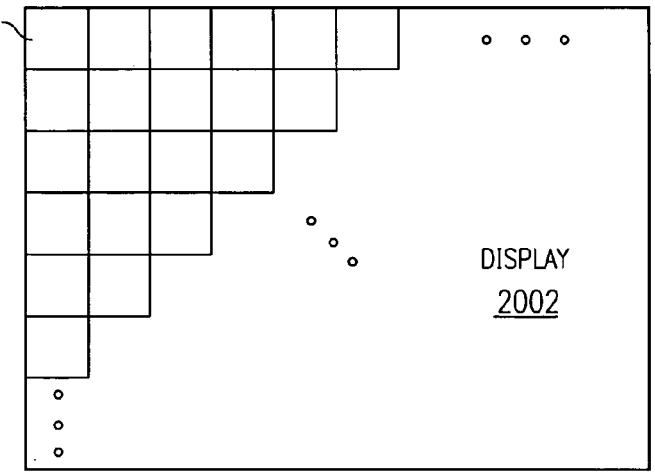
FIG. 20 illustrates a diagrammatic view of a display and the organization of tiles thereon.

Referring now to FIG. 20, there is illustrated a diagrammatic view of a display 2002 having disposed thereon a plurality of tiles 2004. The tiles are arranged in such a manner that there are an even number of tiles for each row and for each column, such that there are a plurality of rows and columns. Each of these tiles is mapped to the memory.

Figure 21:
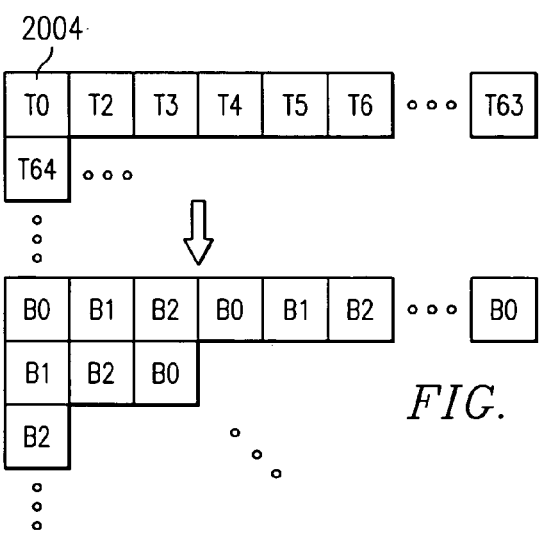
FIG. 21 illustrates a detail of a group of tiles and mapping thereof to the banks in the memory.

Referring now to FIG. 21, there is illustrated a more detailed view of the tiles 2004. The tiles in a given row are illustrated as being 64 in number, denoted as T0, T2, T3, . . . ,T63, although there could be any umber of tiles in a row. The first tile in the second row would be T64 and so on. These tiles are mapped such that each tile is associated with a bank in the memory and, as will be described hereinbelow, each bank is associated with a given row, such that access to a single row in a single bank will allow the pixel data to be output merely by changing the column address and the Channel address. The banks are organized such that the first three tiles, T0, T2 and T3 are mapped to banks B0, B1 and B2, with the next three tiles, T4, T5 and T6 also mapped to banks B0, B1 and B2, albeit to different rows, as will be described hereinbelow. Also, the number of tiles in a given row is an even number whereas the number of banks is an odd number. This will result in the ability to sequence through sequential banks in either a horizontal or a vertical direction. This is due to the fact that the bank number at the beginning of the row is the same as the bank number at the end of the row with the bank number in the first position of the next lower adjacent row being sequenced by a value of 1. Thus, the first three bank numbers in the first row are B0, B1 and B2 and the first three numbers in the first column are B0, B1 and B2. Therefore, the memory can be traversed either across a row or down a column in the same manner, as will be described hereinbelow.

Referring now to FIG. 22, there is illustrated a diagrammatic view of the address that is generated by the MMU which maps the X-Y coordinate from the rendering engine to the memory space. As described hereinabove, the memory is divided into columns in each memory, all the columns being common for each individual channel, banks—there being three banks, B0, B1 and B2—and row addresses in each of the banks. The column address is a five bit address, the bank address is a two bit address, the row address in each bank is a ten bit address and the channel address is a three bit address. Thus, each location in memory is defined by its channel, its bank, its row and its column, such that it will be defined as a "CBRC" address. The actual address is organized such that the first two bits are the most significant bits of the column address, the next ten bits are the row address, the next two bits are the bank address, the next three address bits are the three least significant bits of the column address and the last three bits being the channel address or the actual physical memory selection address referred to as "M" for each bit. Although, for each plane, there are only eight columns, the four planes will comprise thirty two columns such that a five column address is required.

Referring now to FIG. 23, there is illustrated a diagrammatic view of a bank and the CBRC address for each location therein and how it is organized in the bank. In the bank illustrated, there will be 64 addressable locations for 64 pixels, it being understood that only one plane is illustrated. This is the first plane or the color plane. This is illustrated for the top left corner tile in the display, one tile being represented by a single bank, which bank is addressed with a single common row address and the only difference being changing the column address from $C_0$ through $C_7$ and changing the channel from CH0 to CH7. The first pixel value in the illustrated bank has a CBRC address of 0.0.0.0 illustrating the channel CH0, the bank B0, the row $R_0$ and column $C_0$. The next adjacent pixel will have a CBRC address of 1.0.0.0 for the next channel CH1. For the column value set at $C_0$, it is only necessary to sequence through all of the eight memories from channel CH0 through CH7 to access the first eight pixels. Thereafter, the column number is changed from $C_0$ to $C_1$ and then the channel sequenced through from CH0 through CH7 with the row remaining unchanged. This continues down until column $C_7$ is processed for a total of 64 pixels. Note that all of this is achieved with only a single row address.

Figure 25:
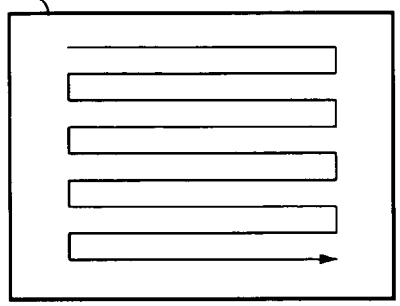
FIG. 25 illustrates a diagrammatic view of the display and the manner in which the tiles are traversed.

Referring now to FIG. 24, there is illustrated a diagrammatic view of how the row addresses are associated with each of the banks in each of the tiles. The first row of pixels is illustrated as having the first three banks B0, B1 and B2 associated with row R0 in the memory. The second three pixels are associated with banks B0, B1 and B2 in the second row of the memory R1. As such, a single row address will allow three adjacent banks of data or three adjacent tiles to be accessed. Therefore, for a single row address, the first step is to sequence through the column and channel addresses and then increment the bank address and again sequence through the channel and column addresses followed by a third increment of the bank address to the channel and column addresses therefor. The row can then be changed and the sequence repeated. Along a given row, for 64 tiles, this will be repeated 21 times and one third. The one third is for the first tile or bank in the 22nd row address, R21. It can be seen that in the second row, the first two banks are B1 and B2 in row 21, with the next bank, B0, being in row 22 with row address R21. However, as illustrated in FIG. 25, the traversal of the display space actually requires at the end of the first row of tiles a change of row address to bank B1 in memory row R41 and then it traverses the second row of the tiles in the opposite direction.

Figure 26:
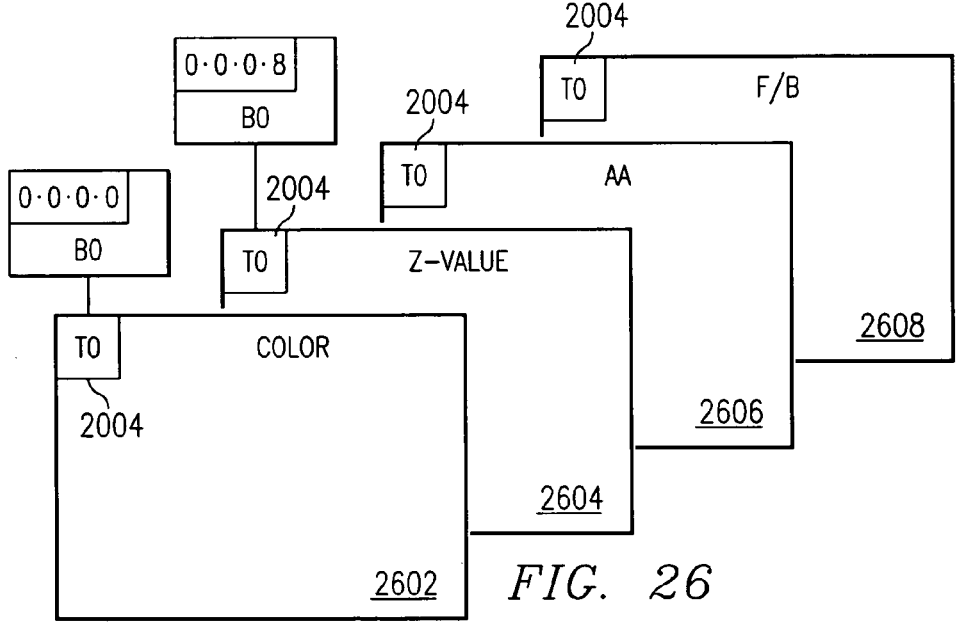
FIG. 26 illustrates a diagrammatic view of the different planes for a pixel.

Referring now to FIG. 26, there is illustrated a diagrammatic view of the multiple planes for each pixel. There are illustrated four planes, a plane 2602 for the color plane, a plane 2604 for the Z-value plane, a plane 2606 for the AA plane and a plane 2608 for the F/B plane. For the first tile, the T0 tile 2004, there will be associated therewith information in bank B0. This will result in 64 pixels, in the disclosed embodiment, wherein the first pixel in the upper lefthand corner in the color plane 2602 will have a CBRC address of 0.0.0.0 and the tile 2004 in the Z-value plane 2604 will have as the first pixel in the upper lefthand corner thereof a pixel with the CBRC address of 0.0.0.8. This is due to the fact that the column addresses for each pixel in the color plane 2602 will range from $C_0$-$C_7$, whereas the column address for the pixels in the Z-value plane 2604 will range from $C_8$-$C_{15}$. Each of the pixel values is a 32 bit value with the total storage space for a given pixel having a bit value of 128 bits. Although not illustrated, there will be an associated bank B0 for each of the tiles 2004 in the planes 2606 and 2608.

Figure 27:
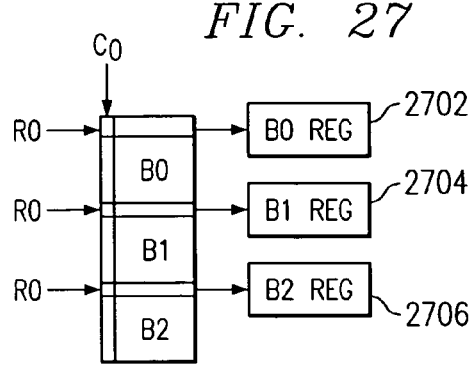
FIG. 27 illustrates a diagrammatic view of the access to the banks in a given memory.
Figure 28:
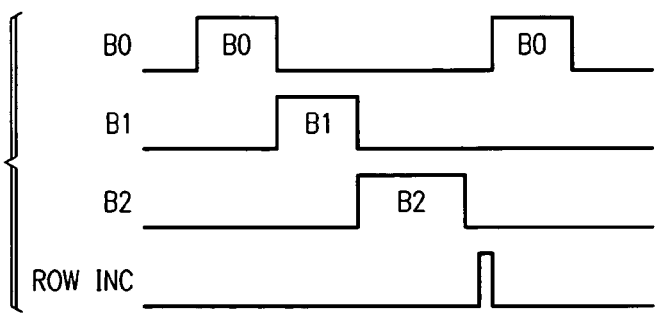
FIG. 28 illustrates the timing diagram for access to the banks.

Referring now to FIG. 27, there is illustrated a diagrammatic view of the banks B0, B1 and B2 and the access thereto and buffering of the outputs thereof. The banks B0, B1 and B2 are illustrated as being three adjacent banks, it being recognized that these banks exist in eight different memories, depending upon the channel selected. Illustrated is the situation where the first row, R0, is selected for each of the banks. This, again, as described hereinabove, is the partitioning aspect of each of the memories. For the column C0, this will result in the output from B0 of information stored therein, followed by the output of information in bank B1, followed by the output of information in bank B2. This merely requires sending the address in a respective one of the banks and then sequencing through the column addresses. The information from the bank B0 is output to a B0 register 2702, the output of the bank B1 is output to a B1 register 2704 and the output of bank B2 is input to a B2 register 2706. FIG. 28 illustrates a timing diagram for the bank access and the fact that each bank must be sequenced through before the other bank is sequenced through, it being understood that only a single row address is required for three adjacent tiles. At the end of sequencing through the bank B2, the row will be incremented. This, of course, will change when traversing from one row of tiles to the other, wherein a row address decrement in the memory will occur at B0 after an initial jump in row value.

It can also be seen that each of the banks can be individually addressed for output of data therefrom. This can be utilized when reading and writing wherein there is a latency between the Read and Write operations. For example, if there were a Read operation being performed on a bank B0 for row R1, a Write operation could be performed on bank B2 or B1 in row R0, but not in bank B0 in row R0. As such, this allows for access of two different rows in the memory at the same time.

Although the preferred embodiment has been described in detail, it should be understood that various changes, substitutions and alterations can be made therein without departing from the spirit and scope of the invention as defined by the appended claims.

What is claimed is:

1. A processing engine, comprising:
   a processing core for receiving an incoming data stream and converting it to output information in a predetermined format for transfer to an output device, said processing core operable to access memory locations with multiple memory access requests for a Read or a Write operation and operable in a first address space;
   a plurality of memory blocks, each individually accessible and all of said plurality of memory blocks configured in a virtual address space different than said first address space;
   a memory mapping device for mapping each of said memory requests to the virtual address space; and
   a pipeline engine for pipelining said mapped memory access requests for both Read and Write operations in accordance with a predetermined pipelining scheme, said memory access requests received in parallel and processed asynchronously, such that access to more than one of said memory blocks can occur at substantially the same time.

2. The processing engine of claim 1, wherein said processing core, said memory mapping device, said pipeline engine and at least a portion of said plurality of memory blocks are contained within a common bounded space with limited connectivity to external peripheral devices.

3. The processing engine of claim 2, wherein said plurality of memory blocks includes at least one block of external memory external to said common bounded space.

4. The processing engine of claim 2, wherein said common bounded space comprises an integrated circuit chip with a limited number of interface pins associated therewith for input/output functions.

5. The processing engine of claim 4, wherein said pins include an external memory access bus of a finite bit width for transferring data thereacross, and wherein said at least a portion of said plurality of memory blocks comprise embedded memory, and wherein said embedded memory is accessible with an effectively wider memory bus than said external memory bus to allow higher speed access thereto.

6. A processing engine, comprising:
   a processing core for receiving an incoming data stream and converting it to output information in a predetermined format for transfer to an output device, said processing core operable to access memory locations with multiple memory access requests for a Read or a Write operation and operable in a first address space;
   at least one memory, accessible by said processing core and configured in a virtual address space different than said first address space;
   a memory mapping device for mapping each of said memory requests to the virtual address space; and
   a pipeline engine for pipelining said mapped memory access requests for both Read and Write operations in accordance with a predetermined pipelining scheme, said memory access requests received in parallel and processed asynchronously, such that said memory access requests can be delivered to said memory in an order different than said predetermined pipelining scheme.

7. The processing engine of claim 6, wherein said processing core, at least a portion of said memory, said memory mapping device and said pipeline engine are contained within a common bounded space with limited connectivity to external peripheral devices.

8. The processing engine of claim 6, wherein said memory includes at least one block of external memory external to said common bounded space.

9. The processing engine of claim 6, wherein said common bounded space comprises an integrated circuit chip with a limited number of interface pins associated therewith for input/output functions.

10. The processing engine of claim 9, wherein said pins include an external memory access bus of a finite bit width for transferring data thereacross, and wherein said at least a portion of said memory comprise embedded memory, and wherein said embedded memory is accessible with an effectively wider memory bus than said external memory bus to allow higher speed access thereto.

* * * * *